(12) United States Patent
Mano et al.

(10) Patent No.: US 10,873,731 B2
(45) Date of Patent: Dec. 22, 2020

(54) PROJECTOR, DISPLAY SYSTEM, IMAGE CORRECTION METHOD, AND COLORIMETRIC METHOD

(71) Applicant: SEIKO EPSON CORPORATION, Tokyo (JP)

(72) Inventors: Tetsuo Mano, Shiojiri (JP); Shinji Kubota, Ina (JP); Hiroyuki Ichieda, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/735,864

(22) Filed: Jan. 7, 2020

(65) Prior Publication Data

US 2020/0221058 A1 Jul. 9, 2020

(30) Foreign Application Priority Data

Jan. 8, 2019 (JP) .................................. 2019-001032
Jan. 8, 2019 (JP) .................................. 2019-001033

(51) Int. Cl.
*G09G 5/02* (2006.01)
*H04N 9/31* (2006.01)
*H04N 5/64* (2006.01)
*H04N 17/00* (2006.01)
*H04N 17/02* (2006.01)

(52) U.S. Cl.
CPC ............. *H04N 9/3182* (2013.01); *G09G 5/02* (2013.01); *H04N 5/64* (2013.01); *H04N 9/3194* (2013.01); *H04N 17/00* (2013.01); *H04N 17/02* (2013.01)

(58) Field of Classification Search
CPC .......... G09G 5/02; H04N 9/31; H04N 9/3182; H04N 9/3194; H04N 5/21; H04N 17/00; H04N 17/02
USPC .......................... 345/589; 348/744, 177, 638
See application file for complete search history.

(56) References Cited

U.S. PATENT DOCUMENTS

| | | | | |
|---|---|---|---|---|
| 5,874,988 A | * | 2/1999 | Gu ............................ | H04N 9/64 348/97 |
| 6,219,099 B1 | * | 4/2001 | Johnson .................... | H04N 9/12 348/383 |
| 6,340,976 B1 | * | 1/2002 | Oguchi ................ | H04N 9/3147 345/22 |

(Continued)

FOREIGN PATENT DOCUMENTS

| | | |
|---|---|---|
| JP | 2005-020581 A | 1/2005 |
| JP | 2005-189542 A | 7/2005 |

(Continued)

*Primary Examiner* — Trang U Tran
(74) *Attorney, Agent, or Firm* — Oliff PLC

(57) ABSTRACT

A projector includes a projection section, a spectral imaging section, and a control section, wherein the control section makes the projection section project an adjusting image corresponding to a color and a gray level of an image to be projected by the projection section while changing the color and the gray level to a first color and a first gray level, the first color and a second gray level, a second color and a third gray level, and the second color and a fourth gray level, sets a measurement condition corresponding to the color to the spectral imaging section, and makes the spectral imaging section take the adjusting images projected by the projection section to obtain spectral imaging data.

11 Claims, 14 Drawing Sheets

(56) References Cited

U.S. PATENT DOCUMENTS

| | | | | |
|---|---|---|---|---|
| 6,618,076 | B1* | 9/2003 | Sukthankar | H04N 5/74 |
| | | | | 345/156 |
| 7,362,336 | B2* | 4/2008 | Miller | G06T 1/0028 |
| | | | | 345/426 |
| 8,654,140 | B2* | 2/2014 | Kanai | H04N 9/3194 |
| | | | | 345/589 |
| 8,884,979 | B2* | 11/2014 | Haraguchi | G03B 17/54 |
| | | | | 345/589 |
| 9,297,942 | B2* | 3/2016 | Spears | G06F 3/0304 |
| 9,671,683 | B2* | 6/2017 | Gamet | G03B 21/26 |
| 10,508,779 | B2* | 12/2019 | Masuda | F21V 9/40 |
| 2006/0238832 | A1 | 10/2006 | Ohsawa | |
| 2007/0097213 | A1 | 5/2007 | Ajito | |
| 2010/0225887 | A1 | 9/2010 | Sato et al. | |

FOREIGN PATENT DOCUMENTS

| | | | |
|---|---|---|---|
| JP | 2010-206584 A | 9/2010 | |
| JP | 4583863 B2 | 11/2010 | |

* cited by examiner

FIG. 3

| ORDER | IMAGE | ADJUSTING IMAGE DISPLAY CONDITION | MEASUREMENT CONDITION | |
|---|---|---|---|---|
| | | COLOR AND GRAY LEVEL | MEASUREMENT WAVELENGTH RANGE | MEASUREMENT WAVELENGTH UNIT |
| 1 | SOLID-RED IMAGE IR1 | RED (R), GRAY LEVEL TR1 | 620nm–750nm | 20nm |
| 2 | SOLID-RED IMAGE IR2 | RED (R), GRAY LEVEL TR2 | 620nm–750nm | 20nm |
| 3 | SOLID-RED IMAGE IR3 | RED (R), GRAY LEVEL TR3 | 620nm–750nm | 20nm |
| 4 | SOLID-RED IMAGE IR4 | RED (R), GRAY LEVEL TR4 | 620nm–750nm | 20nm |
| 5 | SOLID-RED IMAGE IR5 | RED (R), GRAY LEVEL TR5 | 620nm–750nm | 20nm |
| 6 | SOLID-RED IMAGE IR6 | RED (R), GRAY LEVEL TR6 | 620nm–750nm | 20nm |
| 7 | SOLID-RED IMAGE IR7 | RED (R), GRAY LEVEL TR7 | 620nm–750nm | 20nm |
| 8 | SOLID-GREEN IG1 | GREEN (G), GRAY LEVEL TG1 | 495nm–570nm | 20nm |
| 9 | SOLID-GREEN IG2 | GREEN (G), GRAY LEVEL TG2 | 495nm–570nm | 20nm |
| 10 | SOLID-GREEN IG3 | GREEN (G), GRAY LEVEL TG3 | 495nm–570nm | 20nm |
| 11 | SOLID-GREEN IG4 | GREEN (G), GRAY LEVEL TG4 | 495nm–570nm | 20nm |
| 12 | SOLID-GREEN IG5 | GREEN (G), GRAY LEVEL TG5 | 495nm–570nm | 20nm |
| 13 | SOLID-GREEN IG6 | GREEN (G), GRAY LEVEL TG6 | 495nm–570nm | 20nm |
| 14 | SOLID-GREEN IG7 | GREEN (G), GRAY LEVEL TG7 | 495nm–570nm | 20nm |
| 15 | SOLID-BLUE IB1 | BLUE (B), GRAY LEVEL TB1 | 450nm–495nm | 20nm |
| 16 | SOLID-BLUE IB2 | BLUE (B), GRAY LEVEL TB2 | 450nm–495nm | 20nm |
| 17 | SOLID-BLUE IB3 | BLUE (B), GRAY LEVEL TB3 | 450nm–495nm | 20nm |
| 18 | SOLID-BLUE IB4 | BLUE (B), GRAY LEVEL TB4 | 450nm–495nm | 20nm |
| 19 | SOLID-BLUE IB5 | BLUE (B), GRAY LEVEL TB5 | 450nm–495nm | 20nm |
| 20 | SOLID-BLUE IB6 | BLUE (B), GRAY LEVEL TB6 | 450nm–495nm | 20nm |
| 21 | SOLID-BLUE IB7 | BLUE (B), GRAY LEVEL TB7 | 450nm–495nm | 20nm |

PROJECTOR, DISPLAY SYSTEM, IMAGE CORRECTION METHOD, AND COLORIMETRIC METHOD

The present application is based on, and claims priority from JP Application Serial Number 2019-001032 and JP Application Serial Number 2019-001033, both filed Jan. 8, 2019, the disclosure of which is hereby incorporated by reference herein in its entirety.

BACKGROUND

1. Technical Field

The present disclosure relates to a projector, a display system, a method of controlling a projector, an image correction method, a colorimetric method, an image display method, a colorimetric device, and an image display device.

2. Related Art

In the past, there has been known a technology of shooting an image displayed, and correcting the image based on a shooting result. For example, in the correction data acquisition method disclosed in JP-A-2005-20581, an offset image of a black signal level, a primary color image in an arbitrary signal level, a gradation image obtained by changing the signal level of each of the primary colors are sequentially displayed on an image display section. Then, shooting is performed with a calibration camera provided with filters of bands corresponding respectively to the primary colors of red, green, and blue while switching between the bands. The offset correction datum is calculated based on a shot datum obtained by shooting.

However, there is a problem that a good colorimetric result cannot be obtained even with a camera capable of performing shooting in a plurality of bands.

SUMMARY

An aspect of the present disclosure is directed to a projector including a projection section, a spectral imaging section including an imaging element and a spectral element, and a control section configured to control the projection section and the spectral imaging section, wherein the control section sets a first color and a first gray level as a color and a gray level of an image to be projected by the projection section, then makes the projection section project a first image corresponding to the first color and the first gray level set, sets a first measurement condition corresponding to the first color to the spectral imaging section, then makes the spectral imaging section take the first image projected by the projection section to obtain first taken image information, sets the first color and a second gray level as the color and the gray level of the image to be projected by the projection section, then makes the projection section project a second image corresponding to the first color and the second gray level set, sets the first measurement condition corresponding to the first color to the spectral imaging section, then makes the spectral imaging section take the second image projected by the projection section to obtain second taken image information, sets a second color and a third gray level as the color and the gray level of the image to be projected by the projection section, then makes the projection section project a third image corresponding to the second color and the third gray level set, sets a second measurement condition corresponding to the second color to the spectral imaging section, then makes the spectral imaging section take the third image projected by the projection section to obtain third taken image information, sets the second color and a fourth gray level as the color and the gray level of the image to be projected by the projection section, then makes the projection section project a fourth image corresponding to the second color and the fourth gray level set, and sets the second measurement condition corresponding to the second color to the spectral imaging section, then makes the spectral imaging section take the fourth image projected by the projection section to obtain fourth taken image information.

The projector described above may be configured such that the control section generates a correction parameter used to correct an image datum which an image to be projected by the projection section derives from based on the first taken image information, the second taken image information, the third taken image information, and the fourth taken image information obtained.

The projector described above may be configured such that the control section sets a wavelength range corresponding to the first color as an imaging range as the first measurement condition, then makes the spectral imaging section perform imaging while changing a spectral wavelength of the spectral element at first wavelength intervals to obtain an intensity of light corresponding to the spectral wavelength as the first taken image information and the second taken image information, and sets a wavelength range corresponding to the second color as the imaging range as the second measurement condition, then makes the spectral imaging section perform imaging while changing the spectral wavelength of the spectral element at the first wavelength intervals to obtain an intensity of light corresponding to the spectral wavelength as the third taken image information and the fourth taken image information.

The projector described above may be configured such that the control section calculates estimation values of spectra at second wavelength intervals shorter than the first wavelength interval based on the intensity of the light at the first wavelength intervals obtained as the first taken image information, the second taken image information, the third taken image information, and the fourth taken image information, and an estimation matrix used for estimation of the spectra.

The projector described above may be configured such that the estimation matrix is calculated based on the first taken image information, the second taken image information, the third taken image information, and the fourth taken image information output by the spectral imaging section.

The projector described above may be configured such that the estimation matrix has a determinant minimizing a square error between a measurement datum obtained by measuring the first image, the second image, the third image, and the fourth image using a dedicated measurement device at the second wavelength intervals and the estimation values.

The projector described above may be configured such that the spectral element includes a pair of reflecting films opposed to each other, and a gap changing section configured to change a distance between the pair of reflecting films, and the control section makes the gap changing section change the distance between the pair of reflecting films to change the spectral wavelength of the spectral element.

The projector described above may be configured such that the control section sets a third color and a fifth gray level as the color and the gray level of the image to be projected by the projection section, then makes the projection section project a fifth image corresponding to the third color and the fifth gray level set, sets a third measurement condition corresponding to the third color to the spectral imaging section, then makes the spectral imaging section take the fifth image projected by the projection section to obtain fifth taken image information, sets the third color and a sixth gray level as the color and the gray level of the image to be projected by the projection section, then makes the projection section project a sixth image corresponding to the third color and the sixth gray level set, and sets the third measurement condition corresponding to the third color to the spectral imaging section, then makes the spectral imaging section take the sixth image projected by the projection section to obtain sixth taken image information.

The projector described above may be configured such that the first color is red, the first gray level is lower than the second gray level, the second color is green, the third gray level is lower than the fourth gray level, the third color is blue, the fifth gray level is lower than the sixth gray level, a wavelength range corresponding to red is set as the first measurement condition, a wavelength range corresponding to green is set as the second measurement condition, and a wavelength range corresponding to blue is set as the third measurement condition.

The projector described above may be configured such that the first gray level, the third gray level, and the fifth gray level are equal to each other, and the second gray level, the fourth gray level, and the sixth gray level are equal to each other.

The projector described above may be configured such that the control section sets the first color and a seventh gray level as the color and the gray level of the image to be projected by the projection section, then makes the projection section project a seventh image corresponding to the first color and the seventh gray level set, sets the first measurement condition corresponding to the first color to the spectral imaging section, then makes the spectral imaging section take the seventh image projected by the projection section to obtain seventh taken image information, sets the second color and an eighth gray level as the color and the gray level of the image to be projected by the projection section, then makes the projection section project an eighth image corresponding to the second color and the eighth gray level set, sets the second measurement condition corresponding to the second color to the spectral imaging section, then makes the spectral imaging section take the eighth image projected by the projection section to obtain eighth taken image information, sets the third color and a ninth gray level as the color and the gray level of the image to be projected by the projection section, then makes the projection section project a ninth image corresponding to the third color and the ninth gray level set, and sets the third measurement condition corresponding to the third color to the spectral imaging section, then makes the spectral imaging section take the ninth image projected by the projection section to obtain ninth taken image information, the seventh gray level is a gray level between the first gray level and the second gray level, the eighth gray level is a gray level between the third gray level and the fourth gray level, and the ninth gray level is a gray level between the fifth gray level and the sixth gray level.

Another aspect of the present disclosure is directed to a display system having a first projector including a first projection section, a first spectral imaging section having a first imaging element and a first spectral element, and a first control section configured to determine a color and a gray level of an image to be projected by the first projection section, then make the first projection section project the image corresponding to the color and the gray level determined, set a measurement condition determined based on the color of the image determined to the first spectral imaging section, and then make the first spectral imaging section take the image projected by the first projection section to obtain first taken image information, and a second projector including a second projection section, a second spectral imaging section having a second imaging element and a second spectral element, and a second control section configured to determine a color and a gray level of an image to be projected by the second projection section, then make the second projection section project the image corresponding to the color and the gray level determined, set a measurement condition determined based on the color of the image determined to the second spectral imaging section, and then make the second spectral imaging section take the image projected by the second projection section to obtain second taken image information, wherein the first control section changes at least one of the color and the gray level of the image to be projected by the first projection section a plurality of times to obtain a plurality of pieces of the first taken image information output by the first spectral imaging section, the second control section changes at least one of the color and the gray level of the image to be projected by the second projection section a plurality of times to obtain a plurality of pieces of the second taken image information output by the second spectral imaging section, and the first control section generates a first correction parameter used to correct an image to be projected by the first projector and a second correction parameter used to correct an image to be projected by the second projector based on the plurality of pieces of the first taken image information obtained, and the plurality of pieces of the second taken image information received from the second control section.

Another aspect of the present disclosure is directed to a method of controlling a projector including a projection section and a spectral imaging section having an imaging element and a spectral element, the method including the steps of setting a first color and a first gray level as a color and a gray level of an image to be projected by the projection section, then making the projection section project a first image corresponding to the first color and the first gray level set, setting a first measurement condition corresponding to the first color to the spectral imaging section, then making the spectral imaging section take the first image projected by the projection section to obtain first taken image information, setting the first color and a second gray level as the color and the gray level of the image to be projected by the projection section, then making the projection section project a second image corresponding to the first color and the second gray level set, setting the first measurement condition corresponding to the first color to the spectral imaging section, then making the spectral imaging section take the second image projected by the projection section to obtain second taken image information, setting a second color and a third gray level as the color and the gray level of the image to be projected by the projection section, then making the projection section project a third image corresponding to the second color and the third gray level set, setting a second measurement condition corresponding to the second color to the spectral imaging section, then making the spectral imaging section take the third image projected by the projection section to obtain third taken image information, setting the second color and a fourth gray level as the color and the gray level of the image to be projected by the projection section, then making the projection section project a fourth image corresponding to the second color and the fourth gray level set, and setting the second measurement condition corresponding to the second color to the spectral imaging section, then making the spectral imaging section take the fourth image projected by the projection section to obtain fourth taken image information.

Another aspect of the present disclosure is directed to an image correction method in a display system including a first projector having a first projection section and a first spectral imaging section having a first imaging element and a first spectral element, and a second projector having a second projection section and a second spectral imaging section having a second imaging element and a second spectral element, the method including a first determination step of determining a color and a gray level of an image to be projected by the first projection section in the first projector, a first projection step of making the first projection section project an image corresponding to the color and the gray level determined in the first projector, a first acquisition step of setting a measurement condition determined based on the color of the image determined to the first spectral imaging section, and then making the first spectral imaging section take the image projected by the first projection section to obtain first taken image information in the first projector, a second determination step of determining a color and a gray level of an image to be projected by the second projection section in the second projector, a second projection step of making the second projection section project an image corresponding to the color and the gray level determined in the second projector, a second acquisition step of setting a measurement condition determined based on the color of the image determined to the second spectral imaging section, and then making the second spectral imaging section take the image projected by the second projection section to obtain second taken image information in the second projector, and a generation step of generating a first correction parameter used to correct an image to be projected by the first projector and a second correction parameter used to correct an image to be projected by the second projector in the first projector, wherein in the first projector, at least one of the color and the gray level of the image to be projected by the first projection section is changed a plurality of times in the first determination step, the first projection section is made to project the images with the color and the gray level at least one of which was changed in the first projection step, and the first spectral imaging section is made to take the images projected by the first projection section to obtain a plurality of pieces of the first taken image information in the first acquisition step, in the second projector, at least one of the color and the gray level of the image to be projected by the second projection section is changed a plurality of times in the second determination step, the second projection section is made to project the images with the color and the gray level at least one of which was changed in the second projection step, and the second spectral imaging section is made to take the images projected by the second projection section to obtain a plurality of pieces of the second taken image information in the second acquisition step, and in the first projector, the first correction parameter and the second correction parameter are generated in the generation step based on the plurality of pieces of the first taken image information obtained, and the plurality of pieces of the second taken image information received from the second projector.

Another aspect of the present disclosure is directed to a colorimetric method of performing colorimetry with a spectral imaging device including an imaging element and a spectral element, the method including an imaging step of taking an image displayed with the spectral imaging device while changing a spectral wavelength of the spectral element at first wavelength intervals within a wavelength range set based on the image to generate imaging data, a calculation step of calculating estimation values of spectra at second wavelength intervals shorter than the first wavelength interval based on the imaging data generated in the imaging step and an estimation matrix used for estimation of the spectra, and a generation step of generating a correction parameter used to correct an image datum which an image to be displayed derives from based on the estimation values of the spectra calculated in the calculation step.

The colorimetric method described above may be configured such that the estimation matrix is calculated based on the imaging data taken by the spectral imaging device.

The colorimetric method described above may be configured such that the estimation matrix has a determinant minimizing a square error between measurement data obtained by measuring the image displayed at the second wavelength intervals with a dedicated measurement device and the estimation values of the spectra.

The colorimetric method described above may be configured such that, in the imaging step, a distance between a pair of reflecting films opposed to each other and provided to the spectral element is changed to change the spectral wavelength of the spectral element, and then the imaging data are output at the first wavelength intervals.

The colorimetric method described above may be configured such that, in the calculation step, the estimation values are calculated based on the imaging data corrected using the correction data used to correct a sensitivity distribution caused in the imaging element, and the estimation matrix.

Another aspect of the present disclosure is directed to an image display method including a display step of displaying an image, an imaging step of taking the image displayed with a spectral imaging section including an imaging element and a spectral element while changing a spectral wavelength of the spectral element at first wavelength intervals within a wavelength range set based on the image displayed to generate imaging data, a calculation step of calculating estimation values of spectra at second wavelength intervals shorter than the first wavelength interval based on the imaging data generated in the imaging step and an estimation matrix used for estimation of the spectra, a generation step of generating a correction parameter used to correct an image datum which an image to be displayed in the display step derives from based on the estimation values of the spectra calculated in the calculation step, and a correction step of correcting the image datum which the image to be displayed in the display step derives from with the correction parameter generated, wherein an image based on the image datum corrected in the correction step is displayed in the display step.

Another aspect of the present disclosure is directed to a colorimetric device including a spectral imaging section including an imaging element and a spectral element, and configured to take an image displayed to output spectral imaging data, a control section configured to set spectral wavelengths at first wavelength intervals within a wavelength range set based on the image displayed as the spectral wavelength of the spectral element, and then make the spectral imaging section generate the imaging data, a storage section configured to store an estimation matrix used for estimation of spectra, an estimation value calculation section configured to calculate estimation values of the spectra at second wavelength intervals shorter than the first wavelength interval based on the imaging data output by the spectral imaging section and the estimation matrix, and a generation section configured to generate a correction parameter used to correct an image datum based on the estimation values calculated by the estimation value calculation section.

Another aspect of the present disclosure is directed to an image display device including a display section configured to display an image, a spectral imaging section including an imaging element and a spectral element, and configured to take the image to output spectral imaging data, a control section configured to set a spectral wavelength of the spectral element at first wavelength intervals within a wavelength range set based on the image, and then make the spectral imaging section generate the imaging data, a storage section configured to store an estimation matrix used for estimation of spectra, an estimation value calculation section configured to calculate estimation values of the spectra at second wavelength intervals shorter than the first wavelength interval based on the imaging data output by the spectral imaging section and the estimation matrix, a generation section configured to generate a correction parameter used to correct an image datum based on the estimation values calculated by the estimation value calculation section, and an image processing section configured to correct the image datum with the correction parameter generated by the generation section.

Another aspect of the present disclosure is directed to a display system including a display device configured to display an image, and a colorimetric device configured to perform colorimetry of the image, wherein the colorimetric device includes a spectral imaging section including an imaging element and a spectral element, and configured to take the image to output spectral imaging data, a control section configured to set a spectral wavelength of the spectral element at first wavelength intervals within a wavelength range set based on the image, and then make the spectral imaging section generate the imaging data, a storage section configured to store an estimation matrix used for estimation of spectra, an estimation value calculation section configured to calculate estimation values of the spectra at second wavelength intervals shorter than the first wavelength interval based on the imaging data output by the spectral imaging section and the estimation matrix, and a generation section configured to generate a correction parameter used to correct an image datum based on the estimation values calculated by the estimation value calculation section.

Another aspect of the present disclosure is directed to a display system including a first display device including a first display section configured to display an image, a first spectral imaging section having a first imaging element and a first spectral element, and configured to take the image displayed by the first display section to output spectral imaging data, a first control section configured to set a spectral wavelength of the first spectral element at first wavelength intervals within a wavelength range set based on the image displayed by the first display section, and then make the first spectral imaging section generate the imaging data, a first storage section configured to store an estimation matrix used for estimation of spectra, and a first estimation value calculation section configured to calculate estimation values of the spectra at second wavelength intervals shorter than the first wavelength interval based on the imaging data output by the first spectral imaging section and the estimation matrix, and a second display device including a second display section configured to display an image, a second spectral imaging section having a second imaging element and a second spectral element, and configured to take the image displayed by the second display section to output spectral imaging data, a second control section configured to set a spectral wavelength of the second spectral element at the first wavelength intervals within a wavelength range set based on the image displayed by the second display section, and then make the second spectral imaging section generate the imaging data, a second storage section configured to store an estimation matrix used for estimation of spectra, and a second estimation value calculation section configured to calculate estimation values of the spectra at the second wavelength intervals shorter than the first wavelength interval based on the imaging data output by the second spectral imaging section and the estimation matrix, wherein the first control section generates a first correction parameter used to correct an image datum which an image to be displayed by the first display device derives from, and a second correction parameter used to correct an image datum which an image to be displayed by the second display device derives from based on the estimation values of the spectra calculated by the first estimation value calculation section and the estimation values of the spectra calculated by the second estimation value calculation section.

BRIEF DESCRIPTION OF THE DRAWINGS

FIG. 3 is a diagram showing a display condition of an adjusting image and measurement conditions.

DESCRIPTION OF EXEMPLARY EMBODIMENTS

First Embodiment

Hereinafter, some embodiments will be described with reference to the accompanying drawings.

Figure 1:
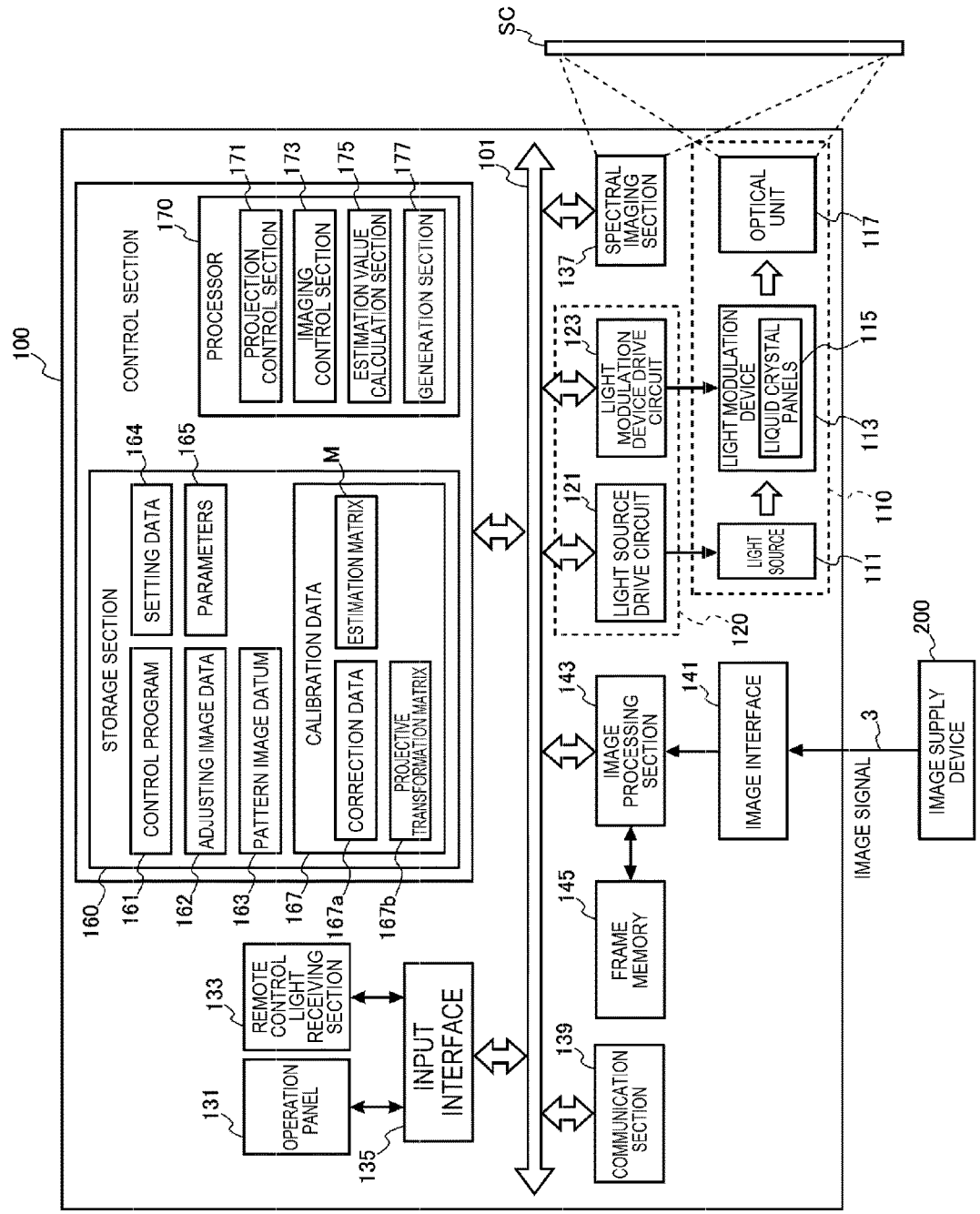
FIG. 1 is a block configuration diagram showing a configuration of a projector.

FIG. 1 is a block configuration diagram showing a configuration of a projector 100. The projector 100 corresponds to an example of an "image display device" according to the present disclosure. The projector 100 is provided with an image projection system, an image processing system, a spectral imaging section 137, and a control section 150 as principal constituents, wherein the image projection system generates image light and then projects the image light to a screen SC, the image processing system electrically processes image data which an optical image derives from, the spectral imaging section 137 takes a projection image displayed on the screen SC, and the control section 150 controls these constituents.

Image Projection System

The image projection system is provided with a projection section 110 and a drive section 120. The projection section 110 corresponds to an example of a "display section" in the present disclosure. The projection section 110 is provided with a light source 111, a light modulation device 113, and an optical unit 117. The drive section 120 is provided with a light source drive circuit 121 and a light modulation device drive circuit 123. The light source drive circuit 121 and the light modulation device drive circuit 123 are coupled to a bus 101 to mutually perform data communication with other constituents of the projector 100 similarly coupled to the bus 101 via the bus 101. To the other constituents, there correspond, for example, the control section 150 and an image processing section 143 shown in FIG. 1.

As the light source 111, there is used a solid-state light source such as an LED (Light Emitting Diode) or a laser source. Further, as the light source 111, there can also be used a lamp such as a halogen lamp, a xenon lamp, or a super high-pressure mercury lamp.

To the light source 111, there is coupled a light source drive circuit 121. The light source drive circuit 121 supplies the light source 111 with a drive current or pulses to put the light source 111 on, or stops the drive current or the pulses to be supplied to thereby put the light source 111 off The light modulation device 113 is provided with light modulation elements for modulating light emitted by the light source 111 to generate the image light. As the light modulation element, it is possible to use, for example, a transmissive or reflective liquid crystal panel, or a digital mirror device. In the present embodiment, as an example, there is described when the light modulation device 113 is provided with liquid crystal panels 115 of a transmissive type as the light modulation elements. The light modulation device 113 is provided with three liquid crystal panels 115 corresponding respectively to the three primary colors of red, green, and blue. The light modulated by the liquid crystal panel 115 enters an optical unit 117 as the image light. Hereinafter, red is described as "R," green is described as "G," and blue is described as "B."

To the light modulation device 113, there is coupled a light modulation device drive circuit 123. The light modulation device drive circuit 123 drives the light modulation device 113 to draw images on the liquid crystal panels 115 frame by frame.

The optical unit 117 is provided with an optical element such as a lens or a mirror, and projects the image light modulated by the light modulation device 113 toward the screen SC. On the screen SC, there is formed an image based on the image light projected by the optical unit 117. The image formed on the screen SC by the image light projected by the projection section 110 is referred to as a projection image.

Operation Input System

The projector 100 is provided with an operation panel 131, a remote control light receiving section 133, and an input interface 135. The input interface 135 is coupled to the bus 101 to mutually perform the data communication with the control section 150 and so on via the bus 101.

The operation panel 131 is disposed in, for example, a housing of the projector 100, and is provided with a variety of switches. When the switch of the operation panel 131 is operated, the input interface 135 outputs an operation signal corresponding to the switch thus operated to the control section 150.

The remote control light receiving section 133 receives an infrared signal transmitted by a remote controller. The remote control light receiving section 133 outputs an operation signal corresponding to the infrared signal thus received. The operation signal input is output by the input interface 135 to the control section 150. The operation signal is a signal corresponding to the switch of the remote controller operated.

Spectral Imaging Section

The spectral imaging section 137 takes the projection image displayed on the screen SC by the projection section 110, and then outputs spectral imaging data.

Figure 2:
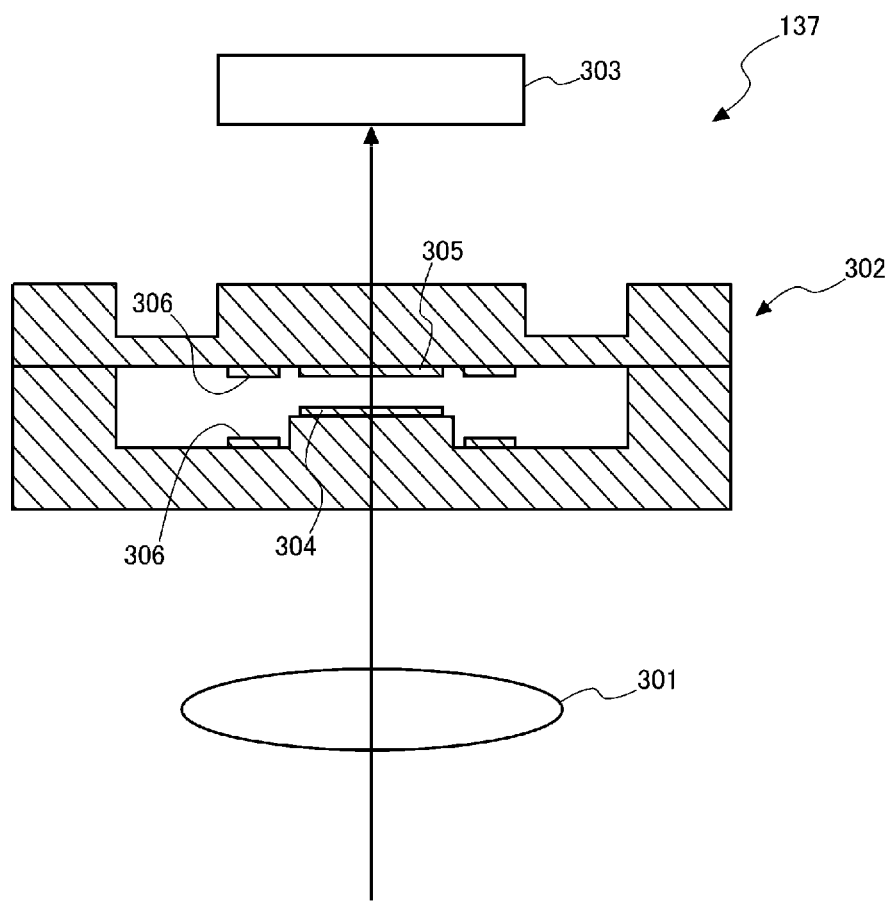
FIG. 2 is a schematic configuration diagram of a spectral imaging section.

FIG. 2 is a schematic configuration diagram of the spectral imaging section 137.

The configuration of the spectral imaging section 137 will be described with reference to FIG. 2. The spectral imaging section 137 corresponds to an example of a "spectral imaging device" in the present disclosure. The spectral imaging section 137 is provided with an incident optical system 301, a spectral element 302, and an imaging element 303, wherein the ambient light enters the incident optical system 301, the spectral element 302 disperses the incident light, and the imaging element 303 images the light dispersed by the spectral element 302.

The incident optical system 301 is formed of, for example, a telecentric optical system, and guides the incident light to the spectral element 302 and the imaging element 303 so that the optical axis and the principal ray become parallel or substantially parallel to each other.

The spectral element 302 is a variable wavelength interference filter provided with a pair of reflecting films 304, 305 opposed to each other, and a gap change section 306 capable of changing the distance between these reflecting films 304, 305. The gap change section 306 is formed of, for example, an electrostatic actuator. Further, the variable wavelength interference filter is also called an etalon.

The spectral element 302 can switch between spectral wavelengths $\lambda i$ (i=1, 2, ..., N) as the wavelengths of the light transmitted through the reflecting films 304, 305 by changing a voltage to be applied to the gap change section 306 due to the control by the control section 150. The imaging element 303 is a device for imaging the light transmitted through the spectral element 302, and is formed of, for example, a CCD or a CMOS. The spectral imaging section 137 sequentially switches the wavelength of the light to be dispersed by the spectral element 302 in accordance with the control by the control section 150, and images the light transmitted through the spectral element 302 with the imaging element 303 to output the spectral imaging data. The spectral imaging data output by the spectral imaging section 137 is input to the control section 150. The spectral imaging data are data output pixel by pixel from the imaging element 303, and are data each representing the intensity of the light received by the pixel, namely the light intensity. It should be noted that the spectral imaging section 137 can be a stereo camera, or can also be a monocular camera.

Communication Section

Figure 7:
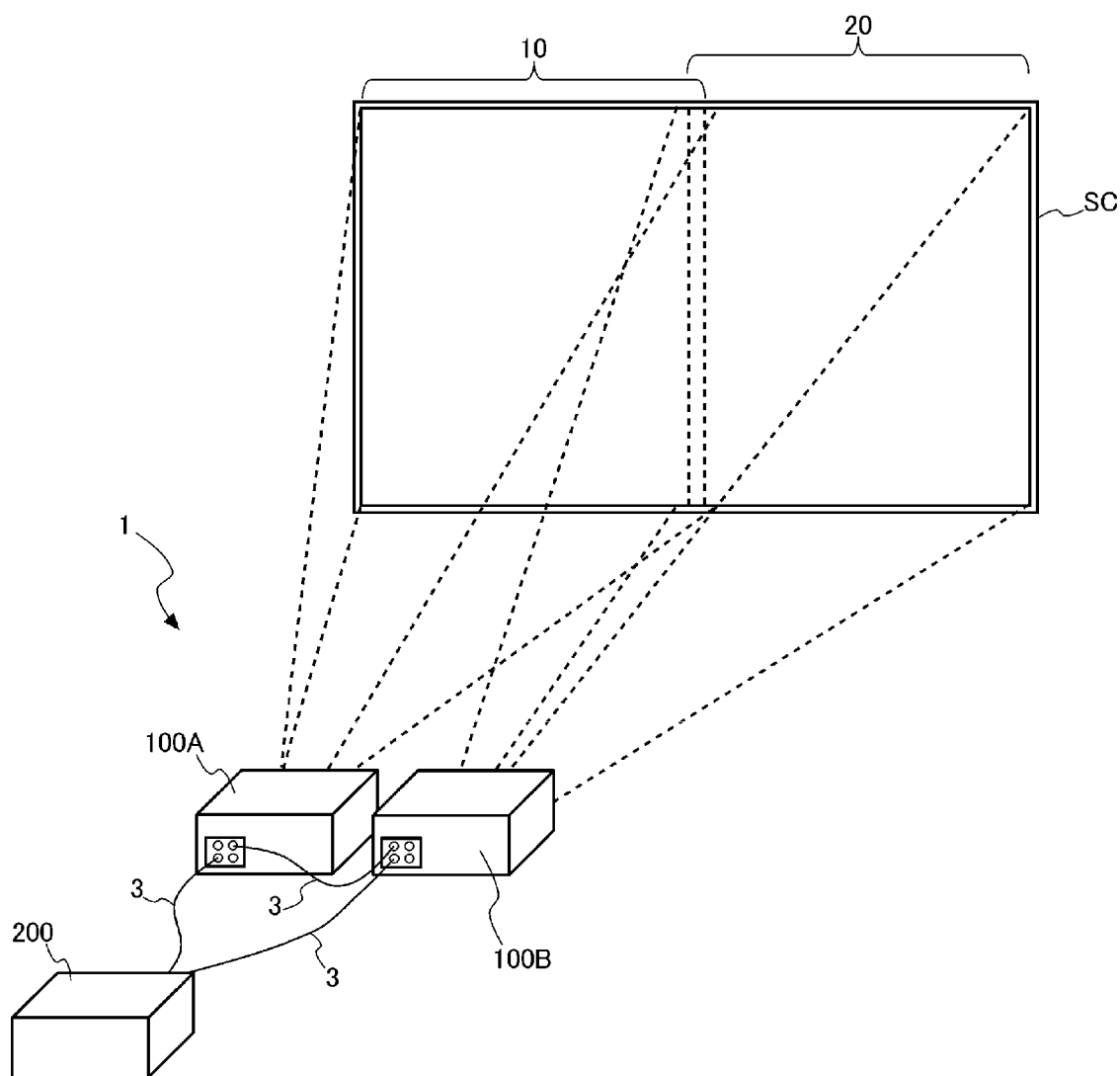
FIG. 7 is a diagram showing a system configuration of a display system.

As shown in FIG. 1, the projector 100 is provided with a communication section 139. The communication section 139 is coupled to the bus 101. As shown in FIG. 7 described later, the communication section 139 functions as an interface when coupling a plurality of projectors 100 to each other to mutually perform the data communication between the projectors 100. The communication section 139 in the present embodiment is a wired interface to which a cable is coupled, but can also be a wireless communication interface for performing the wireless communication such as wireless LAN or Bluetooth. "Bluetooth" is a registered trademark.

Image Processing System

Then, an image processing system of the projector 100 will be described.

As shown in FIG. 1, as the image processing system, the projector 100 is provided with an image interface 141, the image processing section 143, and a frame memory 145. The image processing section 143 is coupled to the bus 101 to mutually perform the data communication with the control section 150 and so on via the bus 101.

The image interface 141 is an interface for receiving an image signal, and is provided with a connector to which a cable 3 is coupled, and an interface circuit for receiving the image signal via the cable 3. The image interface 141 takes out image data and a sync signal from the image signal thus received, and then outputs the image data and the sync signal thus taken out to the image processing section 143. Further, the image interface 141 outputs the sync signal to the control section 150. The control section 150 controls other constituents of the projector 100 in sync with the sync signal. The image processing section 143 performs image processing on the image data in sync with the sync signals.

To the image interface 141, there is coupled an image supply device 200 via the cable 3. As the image supply device 200, there can be used, for example, a notebook PC (Personal Computer), a desktop PC, a tablet terminal, a smartphone, and a PDA (Personal Digital Assistant). Further, the image supply device 200 can also be a video reproduction device, a DVD player, a Blu-ray disc player, or the like. Further, the image signal to be input to the image interface 141 can be a moving image or can also be a still image, and any format can be adopted as the format of the data.

The image processing section 143 and the frame memory 145 are formed of, for example, an integrated circuit. In the integrated circuit, there are included an LSI (Large-Scale Integrated circuit), an ASIC (Application Specific Integrated Circuit), a PLD (Programmable Logic Device), an FPGA (Field-Programmable Gate Array), an SoC (System-on-a-Chip), and so on. Further, an analog circuit can also be included in a part of the configuration of the integrated circuit.

The image processing section 143 is connected to the frame memory 145. The image processing section 143 develops the image datum input from the image interface 141 in the frame memory 145, and then performs the image processing on the image datum thus developed.

The image processing section 143 performs a variety of types of processing including, for example, a geometric correction process for correcting a keystone distortion of the projection image and an OSD (On-Screen Display) process for superimposing an OSD image. Further, the image processing section 143 performs image processing such as an image adjustment process for controlling the luminance or the tint of the image data, a resolution conversion process for adjusting the aspect ratio or the resolution of the image datum in accordance with the light modulation device 113, or a frame rate conversion process.

The image processing section 143 outputs the image datum on which the image processing has been completed to the light modulation device drive circuit 123. The light modulation device drive circuit 123 generates a drive signal for each of the colors of red, green, and blue based on the image datum input from the image processing section 143. Based on the image signals of the respective colors thus generated, the light modulation device drive circuit 123 drives the liquid crystal panels 115 of the corresponding colors of the light modulation device 113 to draw the images on the liquid crystal panels 115 of the respective colors. By the light emitted from the light source 111 passing through the liquid crystal panels 115, the image light corresponding to the image represented by the image datum is generated.

Control Section/Storage Section

The control section 150 is provided with a storage section 160 and a processor 170.

The storage section 160 is formed of a non-volatile semiconductor memory such as a flash memory or an EEPROM, or an SSD (Solid State Drive) using the flash memory. Although in the present embodiment, there is described when the control section 150 is provided with the storage section 160, it is also possible to adopt a configuration in which, for example, the storage section 160 formed of a hard disk drive is disposed outside the control section 150. The storage section 160 stores a control program 161, the image data such as adjusting image data 162 or a pattern image datum 163, setting data 164, parameters 165, and calibration data 167. The control section 150 and the spectral imaging section 137 correspond to an example of a "colorimetric device" in the present disclosure.

The control program 161 is a program such as an OS (Operating System) or an application program to be executed by the processor 170.

The image data stored in the storage section 160 are the data which the image to be displayed on the screen SC by the projector 100 derives from, and include, for example, the pattern image datum 163 and the adjusting image data 162. The pattern image datum 163 is the image datum to be used when generating a projective transformation matrix 167b described later, and is the image datum with marks having predetermined shapes arranged on the four corners of the pattern image datum 163. The adjusting image data 162 are monochromatic image data of the respective colors of R, and B. The storage section 160 stores the adjusting image data 162 with a plurality of gray levels different from each other. The adjusting image data 162 with the respective colors of R, G, and B are prepared at the same gray levels. Further, it is also possible to prepare black and white adjusting image data 162 as the adjusting image data 162. In this case, the white adjusting image datum 162 is prepared at the same gray levels as those of the R, and B adjusting image data 162, and the black adjusting image datum 162 is prepared at a single gray level.

The setting data 164 are the data for setting processing conditions of a variety of types of processing to be performed by the processor 170. The parameters 165 are, for example, parameters of the image processing to be performed by the image processing section 143.

The calibration data 167 include correction data 167a, the projective transformation matrix 167b, and an estimation matrix M. The correction data 167a are the data for correcting the sensitivity distribution of the imaging element 303 to correct the spectral imaging data so that the output of the imaging element is homogenized.

In the imaging element 303, the output of the pixels constituting the imaging element fails to be uniform due to an influence of lens aberration and so on included in the incident optical system 301, but is different by the position of the pixel. In other words, the sensitivity distribution occurs in the imaging element. According to this sensitivity distribution, the output lowers in the periphery compared to the center of the imaging element 303. Therefore, when correcting the tint, the luminance, and so on of the image based on the spectral imaging data taken by the spectral imaging section 137, the correction cannot correctly be performed due to the influence of the error in some cases. Further, the sensitivity distribution of the spectral imaging section 137 is affected by an optical filter which is applied on the surface of the lens to block ultraviolet rays or infrared rays. In other words, the output of the spectral imaging section 137 is different by the color of the image taken by the spectral imaging section 137.

The correction data 167a are generated when manufacturing the projector 100, and is further generated for each of the pixels of the imaging element 303. Further, the plurality of correction data 167a is generated so as to correspond to the colored light beams of R, and B projected by the projection section 110 and the spectral wavelengths $\lambda i$ set in the spectral imaging section 137. By generating the plurality of correction data 167a by the colored light beam, and by the spectral wavelength set in the spectral imaging section 137, it is possible to improve the correction accuracy of the spectral sensitivity of the spectral imaging section 137.

Further, the plurality of correction data 167a is generated so as to correspond to focal distances of the incident optical system 301 of the spectral imaging section 137. By generating the correction data 167a corresponding respectively to the focal distances of the incident optical system 301, even when the incident optical system 301 of the spectral imaging section 137 is changed, and thus the focal distance is changed, it is possible to correct the spectral imaging data using the correction datum 167a corresponding to the focal distance thus changed.

The projective transformation matrix 167b is a transformation matrix for transforming the coordinate set in each of the liquid crystal panels 115 of the light modulation device 113 into a coordinate set in the spectral imaging data. The liquid crystal panels 115 are each provided with a configuration in which a plurality of pixels is arranged in a matrix. The coordinate set in each of the liquid crystal panels 115 is a coordinate for identifying each of the pixels arranged in a matrix. The coordinate set in each of the liquid crystal panels 115 is hereinafter referred to as a panel coordinate. Further, the coordinate set in the spectral imaging data is a coordinate for identifying each of the pixels constituting the imaging element 303. The coordinate set in the spectral imaging data is hereinafter referred to as an imaging coordinate.

The estimation matrix M is a matrix used for the estimation of the spectrum. The estimation matrix M is generated when manufacturing the projector 100, and is stored in the storage section 160 as a part of calibration data 167. The estimation matrix M is generated based on the spectral imaging data taken by the spectral imaging section 137.

On the optical unit 117, there are mounted optical components, and further, the optical component is also used as a component for guiding the light emitted from the light source 111 to the liquid crystal panels 115 of the light modulation device 113. Further, in each of the liquid crystal panels 115 as the optical component, each of the pixels constituting the liquid crystal panel 115 has a spectral characteristic, and there occurs an error in the wavelength of the image light transmitted through the pixel between the pixels. Due to the optical characteristics of these optical components, an error occurs in the values of the spectral imaging data generated by the spectral imaging section 137, and thus, the colorimetric accuracy decreases.

Therefore, by calculating the estimation matrix M based on the spectral imaging data generated by the spectral imaging section 137, and spectrum colorimetric data measured by a spectrum measurement device, it is possible to obtain a determinant capable of correcting the optical characteristic. The spectrum measurement device is a device dedicated to the spectrum measurement, and is an external device different from the projector 100. The calculation procedure of the estimation matrix will be described below.
Control Section/Storage Section/Calculation Procedure of Estimation Matrix M Firstly, the adjusting image is made to be displayed on the screen SC. The control section 150 retrieves the adjusting image data 162 from the storage section 160, and then outputs the adjusting image data 162 to the image processing section 143. Further, the control section 150 controls the image processing section 143 and the drive section 120 to project the image light on the projection section 110 to display the adjusting image on the screen SC.

Then, the adjusting image thus displayed is taken by the spectral imaging section 137 to generate the spectral imaging data, and further, the spectrum of the adjusting image is measured by the spectrum measurement device to generate the spectrum measurement data. The spectrum measurement device is a device dedicated to the spectrum measurement, and is an external device different from the projector 100. The spectrum colorimetric data are constituted by the spectra of the pixels constituting the spectrum colorimetric data or representative spectra. The representative spectra can be the spectra of predetermined pixels, for example, or can also be an average value of the spectra of a plurality of selected pixels.

Then, the control section 150 is made to change the color and the gray level of the adjusting image to be displayed on the screen SC, the adjusting image thus displayed is taken by the spectral imaging section 137, and thus, the measurement is performed by the spectrum measurement device. This process is performed with respect to all colors and all gray levels of the adjusting image data 162 stored by the storage section 160 to thereby obtain the spectral imaging data and the spectrum measurement data with respect to each of the colors and gray levels of the adjusting image data 162 prepared in advance.

Then, the spectral imaging data output by the spectral imaging section 137 and the spectrum measurement data measured by the spectrum measurement device are compared to each other to generate the estimation matrix M for calculating the spectrum estimation data from the spectral imaging data. Here, the spectral imaging data and the spectrum estimation data to be compared to each other are the data obtained by imaging or measuring the colored light having same color and the same gray level.

The estimation matrix M is calculated using the method of least squares. The spectrum measurement data measured by the spectrum measurement device are described as "Y," and N×16 spectra obtained from the spectral imaging data of the spectral imaging section 137 are described as "X." Further, "N" represents a learning count. For example, when the image having the three colors of R, G, and B, and further seven gray levels for each of the colors is displayed as the adjusting image, and is made to be measured by the spectral imaging section 137 and the spectrum measurement device, the learning count "N" becomes 3 multiplied by 7 to 21. The value of the estimation matrix M is determined so that the square error Δ between the spectrum estimation value "XM" obtained by multiplying the N×16 spectra obtained from the spectral imaging data of the spectral imaging section 137 by the estimation matrix M, and the spectrum measurement data "Y" becomes the smallest. The calculation formula of the square error Δ is shown as the formula (1a). Further, a formula obtained by partially differentiating the both sides of the formula (1a) using "M" as a variable is expressed as the formula (1b).

$$\Delta = \Sigma |Y - XM|^2 \tag{1a}$$

$$\frac{\partial \Delta}{\partial M} = X^T(Y - XM) \tag{1b}$$

When assuming the minimum value of the square error Δ as "0" in the formula (1b) described above, the formula (2) described below is true.

$$X^T Y = X^T X M \tag{2}$$

The term "$X^T$" shown in the formulas (1b), (2) is the transposed matrix of X.

Further, according to the formula (2), the value of the estimation matrix M is expressed as the formula (3) described below.

$$M = (X^T X)^{-1} X^T Y \tag{3}$$

Further, when the value of the learning count "N" described above is small, it lapses into the state in which the spectrum estimation can only function with respect to the learning data. Specifically, the absolute values of the elements of the estimation matrix M become extremely large, and an exaggerated response to a noise occurs. Therefore, when the value of the learning count "N" is small, a regularization term "β" is introduced into the calculation formula of the square error Δ expressed by the formula (1a) described above. As the regularization term "β," there is used a value selected by an experiment. The square error Δ in which the regularization term "β" is introduced is expressed as the formula (4a). Further, a formula obtained by partially differentiating the both sides of the formula (4a) using "M" as a variable is expressed as the formula (4b).

$$\Delta = \sum |Y - XM|^2 + \beta M^T M \tag{4a}$$

$$\frac{\partial \Delta}{\partial M} = X^T(Y - XM) + \beta M \tag{4b}$$

When assuming the minimum value of the square error Δ as "0" in the formula (4b) described above, the formula (5) described below is true.

$$X^T Y = X^T X M - \beta M \tag{5}$$

Therefore, according to the formula (5), the value of the estimation matrix M is expressed as the formula (6) described below.

$$M = (X^T X - \beta I)^{-1} X^T Y \tag{6}$$

The character "I" shown in the formula (6) represents a unit matrix.

Control Section/Processor

The processor 170 is an arithmetic processing device formed of, for example, a CPU (Central Processing Unit), a DSP (Digital Signal Processor), or a microcomputer. The processor 170 can be formed of a single processor, or can also be formed by combining a plurality of processors.

In the control section 150, the processor 170 performs the arithmetic processing in accordance with the control program 161 to realize a variety of functions. FIG. 1 shows the functional blocks corresponding respectively to the functions provided to the control section 150. The control section 150 is provided with a projection control section 171, an imaging control section 173, an estimation value calculation section 175, and a generation section 177 as the functional blocks.

Control Section/Processor/Projection Control Section

The projection control section 171 controls the tint, the luminance, and so on of the image to be displayed on the screen SC by the projection section 110. Specifically, the projection control section 171 controls the image processing section 143 to perform the image processing on the image data input from the image interface 141. On this occasion, it is possible for the projection control section 171 to retrieve the parameter which is necessary for the image processing section 143 to perform the processing from the storage section 160, and then output the parameter to the image processing section 143.

Further, the projection control section 171 controls the light source drive circuit 121 to put the light source of the light source section 111 on or off, and then control the luminance of the light source 111.

Further, when the projection control section 171 starts the processing of the image quality control described later, the projection control section 171 retrieves the pattern image datum 163 and the adjusting image data 162 from the storage section 160 to make the image processing section 143 perform the processing. Further, the projection control section 171 controls the image processing section 143 and the drive section 120 to display the pattern image corresponding to the pattern image datum 163 and the adjusting images corresponding to the adjusting image data 162 on the screen SC.

Further, when the projection control section 171 displays the adjusting image data 162 on the screen SC, the projection control section 171 selects the color and the gray level of the adjusting image to be projected by the projection section 110, retrieves the adjusting image data 162 with the color and the gray level thus selected from the storage section 160, and then makes the image processing section 143 process the adjusting image data 162.

For example, it is assumed that the three colors of R, G, and B are stored in the storage section 160 as the adjusting image data 162. Further, it is assumed that as the adjusting image data 162 with each of the colors, there are prepared the adjusting image data 162 at seven gray levels. Further, it is assumed that the order of R, G, and B is set as the display order of the adjusting images, and it is determined that the adjusting images are displayed in ascending order of the gray level.

The projection control section 171 firstly retrieves the adjusting image datum 162 with the lowest gray level out of the adjusting image data 162 for R from the storage section 160, and then controls the image processing section 143 and the drive section 120 to display the adjusting image corresponding to the adjusting image datum 162 thus retrieved on the screen SC. R corresponds to an example of a "first color" in the present disclosure.

When the spectral imaging section 137 is made to take the adjusting image thus displayed, and the spectral imaging data is stored in the storage section 160, the projection control section 171 changes the gray level of the adjusting image for R to be displayed on the screen SC. The projection control section 171 retrieves the adjusting image datum 162 for R with the second lowest gray level from the storage section 160, and then controls the image processing section 143 and the drive section 120 to display the adjusting image corresponding to the adjusting image datum 162 thus retrieved on the screen SC. Subsequently, the projection control section 171 repeats substantially the same process to display the adjusting image for R on the screen SC at all of the seven gray levels prepared in advance.

The magnitude relation of the gray level between a "first gray level," a "second gray level," and a "seventh gray level" is in a relationship of "first gray level"<"seventh gray level"<"second gray level." For example, when assuming that the gray level of the adjusting image datum 162 for R with the lowest gray level corresponds to an example of the "first gray level," for example, the gray levels of the adjusting image data 162 for R with the second through sixth lowest gray levels correspond to an example of the "seventh gray level" in the present disclosure. Similarly, the gray levels of the adjusting image data 162 for R with the third through seventh lowest gray levels correspond to an example of the "second gray level" in the present disclosure.

Further, the image displayed on the screen SC based on the adjusting image datum 162 for R with the lowest gray level corresponds to an example of a "first image" in the present disclosure, and the spectral imaging data obtained by taking an image of the screen SC on which the image based on the adjusting image datum 162 is displayed using the spectral imaging section 137 corresponds to an example of "first taken image information" in the present disclosure.

Further, the images displayed on the screen SC based on the adjusting image data 162 for R with the second through sixth lowest gray levels correspond to an example of a "seventh image" in the present disclosure, and the spectral imaging data obtained by taking images of the screen SC on which the images based on the adjusting image data 162 are displayed using the spectral imaging section 137 correspond to an example of "seventh taken image information" in the present disclosure.

Further, the images displayed on the screen SC based on the adjusting image data 162 for R with the third through seventh lowest gray levels correspond to an example of a "second image" in the present disclosure, and the spectral imaging data obtained by taking images of the screen SC on which the images based on the adjusting image data 162 are displayed using the spectral imaging section 137 correspond to an example of "second taken image information" in the present disclosure.

When the adjusting images for R are displayed on the screen SC at all of the seven gray levels, the projection control section 171 changes the color of the adjusting images to be displayed on the screen SC from R to G. G corresponds to an example of a "second color" in the present disclosure. The projection control section 171 retrieves the adjusting image datum 162 with the lowest gray level out of the adjusting image data 162 for G from the storage section 160, and then controls the image processing section 143 and the drive section 120 to display the adjusting image corresponding to the adjusting image datum 162 thus retrieved on the screen SC. When the spectral imaging section 137 is made to take the adjusting image thus displayed, and the spectral imaging data is stored in the storage section 160, the projection control section 171 changes the gray level of the adjusting image for G to be displayed on the screen SC. The projection control section 171 retrieves the adjusting image datum 162 for G with the second lowest gray level from the storage section 160, and then controls the image processing section 143 and the drive section 120 to display the adjusting image corresponding to the adjusting image datum 162 thus retrieved on the screen SC. Subsequently, the projection control section 171 repeats substantially the same process to display the adjusting image for G on the screen SC at all of the seven gray levels prepared in advance.

The magnitude relation of the gray level between a "third gray level," a "fourth gray level," and an "eighth gray level" is in a relationship of "third gray level"<"eighth gray level"<"fourth gray level." For example, when assuming that the gray level of the adjusting image datum 162 for G with the lowest gray level corresponds to an example of the "third gray level," for example, the gray levels of the adjusting image data 162 for G with the second through sixth lowest gray levels correspond to an example of the "eighth gray level" in the present disclosure. Similarly, the gray levels of the adjusting image data 162 for G with the third through seventh lowest gray levels correspond to an example of the "fourth gray level" in the present disclosure.

Further, the image displayed on the screen SC based on the adjusting image datum 162 for G with the lowest gray level corresponds to an example of a "third image" in the present disclosure, and the spectral imaging data obtained by taking an image of the screen SC on which the image based on the adjusting image datum 162 is displayed using the spectral imaging section 137 corresponds to an example of "third taken image information" in the present disclosure.

Further, the images displayed on the screen SC based on the adjusting image data 162 for G with the second through sixth lowest gray levels correspond to an example of an "eighth image" in the present disclosure, and the spectral imaging data obtained by taking images of the screen SC on which the images based on the adjusting image data 162 are displayed using the spectral imaging section 137 correspond to an example of "eighth taken image information" in the present disclosure.

Further, the images displayed on the screen SC based on the adjusting image data 162 for G with the third through seventh lowest gray levels correspond to an example of a "fourth image" in the present disclosure, and the spectral imaging data obtained by taking images of the screen SC on which the images based on the adjusting image data 162 are displayed using the spectral imaging section 137 correspond to an example of "fourth taken image information" in the present disclosure.

The projection control section 171 performs substantially the same processing on the adjusting images for B. B corresponds to an example of a "third color" in the present disclosure.

The magnitude relation of the gray level between a "fifth gray level," a "sixth gray level," and a "ninth gray level" is in a relationship of "fifth gray level"<"ninth gray level"<"sixth gray level." For example, when assuming that the gray level of the adjusting image datum 162 for B with the lowest gray level corresponds to an example of the "fifth gray level," for example, the gray levels of the adjusting image data 162 for B with the second through sixth lowest gray levels correspond to an example of the "ninth gray level" in the present disclosure. Similarly, the gray levels of the adjusting image data 162 for B with the third through seventh lowest gray levels correspond to an example of the "sixth gray level" in the present disclosure.

Further, the image displayed on the screen SC based on the adjusting image datum 162 for B with the lowest gray level corresponds to an example of a "fifth image" in the present disclosure, and the spectral imaging data obtained by taking an image of the screen SC on which the image based on the adjusting image datum 162 is displayed using the spectral imaging section 137 corresponds to an example of "fifth taken image information" in the present disclosure.

Further, the images displayed on the screen SC based on the adjusting image data 162 for B with the second through sixth lowest gray levels correspond to an example of a "ninth image" in the present disclosure, and the spectral imaging data obtained by taking images of the screen SC on which the images based on the adjusting image data 162 are displayed using the spectral imaging section 137 correspond to an example of "ninth taken image information" in the present disclosure.

Further, the images displayed on the screen SC based on the adjusting image data 162 for B with the third through seventh lowest gray levels correspond to an example of a "sixth image" in the present disclosure, and the spectral imaging data obtained by taking images of the screen SC on which the images based on the adjusting image data 162 are displayed using the spectral imaging section 137 correspond to an example of "sixth taken image information" in the present disclosure.

It should be noted that the "first gray level" as the gray level of the adjusting image datum 162 for R, the "third gray level" as the gray level of the adjusting image datum 162 for G, and the "fifth gray level" as the gray level of the adjusting image datum 162 for B can be set to the same gray level. Further, the "second gray level" as the gray level of the adjusting image datum 162 for R, the "fourth gray level" as the gray level of the adjusting image datum 162 for and the "sixth gray level" as the gray level of the adjusting image datum 162 for B can be set to the same gray level. Similarly, the "seventh gray level" as the gray level of the adjusting image datum 162 for R, the "eighth gray level" as the gray level of the adjusting image datum 162 for G, and the "ninth gray level" as the gray level of the adjusting image datum 162 for B can be set to the same gray level. By performing imaging at the same gray level for the colors of R, and G, B, it is possible to improve the correction accuracy of the color correction.

Control Section/Processor/Imaging Control Section

The imaging control section 173 makes the spectral imaging section 137 perform imaging. The spectral imaging section 137 performs imaging in accordance with the control by the imaging control section 173, and then outputs the spectral imaging data.

Further, when the imaging control section 173 makes the spectral imaging section 137 take the adjusting image displayed on the screen SC, the imaging control section 173 sets the wavelength range in which imaging is performed by the spectral imaging section 137. When the imaging control section 173 makes the spectral imaging section 137 take the adjusting images for R, the imaging control section 173 sets a range, for example, no less than 620 nm and no more than 750 nm as the wavelength range in which imaging is performed. Further, when the imaging control section 173 makes the spectral imaging section 137 take the adjusting images for the imaging control section 173 sets a range, for example, no less than 495 nm and no more than 570 nm as the wavelength range in which imaging is performed. Further, when the imaging control section 173 makes the spectral imaging section 137 take the adjusting images for B, the imaging control section 173 sets a range, for example, no less than 450 nm and no more than 495 nm as the wavelength range in which imaging is performed.

For example, the wavelength range no less than 620 nm and no more than 750 nm set when making the spectral imaging section 137 take the adjusting images for R corresponds to an example of a "first measurement condition" in the present disclosure. Further, the wavelength range no less than 495 nm and no more than 570 nm set when making the spectral imaging section 137 take the adjusting images for G corresponds to an example of a "second measurement condition" in the present disclosure. Further, the wavelength range no less than 450 nm and no more than 495 nm set when taking the adjusting images for B corresponds to an example of a "third measurement condition" in the present disclosure.

Further, the imaging control section 173 changes the voltage to be applied to a gap change section 306 to change the spectral wavelength $\lambda i$ of the spectral element 302. Thus, the spectral imaging section 137 performs imaging while changing the spectral wavelength $\lambda i$ at first wavelength intervals set in advance. In the present embodiment, there is described when the spectral imaging section 137 performs imaging at the wavelength intervals of 20 nm. The wavelength interval "20 nm" corresponds to an example of a "first wavelength interval" in the present disclosure. For example, when making the spectral imaging section 137 take the adjusting images for red, the imaging control section 173 makes the spectral imaging section 137 perform imaging at intervals of 20 nm within the wavelength range no less than 620 nm and no more than 750 nm. The imaging control section 173 inputs the spectral imaging data output from the spectral imaging section 137, and then temporarily stores the spectral imaging data thus input in the storage section 160.

In the present embodiment, it is possible for the projector 100 to set the measurement condition corresponding to the color of the adjusting image in the spectral imaging section 137 to generate the spectral imaging data while changing the color and the gray level of the adjusting image to be displayed on the screen SC by the projection section 110. It is possible to measure the intensity of the light at the first wavelength intervals with respect to a plurality of different colors. Therefore, it is possible for the projector 100 to increase the accuracy of the colorimetry to efficiently increase the correction accuracy of the image to be projected by the projector 100.

In order to increase the accuracy of the colorimetry, it is necessary to project the adjusting images of a number of colors and gray levels to measure the adjusting images in a broad range and in a detailed range, but it requires time and so on, and the efficiency degrades. Further, when a dedicated length measuring machine is used, the control becomes complicated, and the efficiency further degrades.

The projector 100 according to the present embodiment is provided with the projection section 110 and the spectral imaging section 137, makes the projection section 110 continuously project the adjusting images at least at two gray levels for each of the colors of the adjusting image set to, for example, three colors of R, and B, and then makes the spectral imaging section 137 perform imaging in the measurement wavelength range corresponding to the adjusting image thus projected.

FIG. 3 is a diagram showing a display condition of the adjusting image and measurement conditions.

In the present embodiment, as shown in FIG. 3 and (A) through (C) described below, as the adjusting image data 162 for each color, there are prepared the adjusting image data at the seven gray levels, the order of R, G, and B is set as the display order of the adjusting images, the adjusting images are displayed in descending order of the gray level, and are measured in the measurement conditions corresponding to the adjusting image currently projected. In the present embodiment, an image low in gray level is defined as a dark image, and an image high in gray level is defined as a bright image, but it is also possible to define the image low in gray level as a bright image, and define the image high in gray level as a dark image. Further, it is also possible to make each of the gray levels the same between the colors.

(A) Firstly, the color of the adjusting image is set to R, (1) a solid-red image IR1 with a gray level TR1 set as the gray level is projected, and is then measured in the range no less than 620 nm and no more than 750 nm as the wavelength range corresponding to red. Further, (2) a solid-red image IR2 with a gray level TR2 set as the gray level is projected, and is then measured in the range no less than 620 nm and no more than 750 nm as the wavelength range corresponding to red. Further, (3) a solid-red image IR3 with a gray level TR3 set as the gray level is projected, and is then measured in the range no less than 620 nm and no more than 750 nm as the wavelength range corresponding to red. Further, (4) a solid-red image IR4 with a gray level TR4 set as the gray level is projected, and is then measured in the range no less than 620 nm and no more than 750 nm as the wavelength range corresponding to red. Further, (5) a solid-red image IRS with a gray level TR5 set as the gray level is projected, and is then measured in the range no less than 620 nm and no more than 750 nm as the wavelength range corresponding to red. Further, (6) a solid-red image IR6 with a gray level TR6 set as the gray level is projected, and is then measured in the range no less than 620 nm and no more than 750 nm as the wavelength range corresponding to red. Further, (7) a solid-red image IR7 with a gray level TR7 set as the gray level is projected, and is then measured in the range no less than 620 nm and no more than 750 nm as the wavelength range corresponding to red.

Here, the gray levels are in the relationship of $TR1<TR2<TR3<TR4<TR5<TR6<TR7$, and the luminance values of the images are in the relationship of $IR1<IR2<IR3<IR4<IR5<IR6<IR7$.

(B) The color of the adjusting image is set to (1) a solid-green image IG1 with a gray level TG1 set as the gray level is projected, and is then measured in the range no less than 495 nm and no more than 570 nm as the wavelength range corresponding to green. Further, (2) a solid-green image IG2 with a gray level TG2 set as the gray level is projected, and is then measured in the range no less than 495 nm and no more than 570 nm as the wavelength range corresponding to green. Further, (3) a solid-green image IG3 with a gray level TG3 set as the gray level is projected, and is then measured in the range no less than 495 nm and no more than 570 nm as the wavelength range corresponding to green. Further, (4) a solid-green image IG4 with a gray level TG4 set as the gray level is projected, and is then measured in the range no less than 495 nm and no more than 570 nm as the wavelength range corresponding to green. Further, (5) a solid-green image IG5 with a gray level TG5 set as the gray level is projected, and is then measured in the range no less than 495 nm and no more than 570 nm as the wavelength range corresponding to green. Further, (6) a solid-green image IG6 with a gray level TG6 set as the gray level is projected, and is then measured in the range no less than 495 nm and no more than 570 nm as the wavelength range corresponding to green. Further, (7) a solid-green image IG7 with a gray level TG7 set as the gray level is projected, and is then measured in the range no less than 495 nm and no more than 570 nm as the wavelength range corresponding to green.

Here, the gray levels are in the relationship of $TG1<TG2<TG3<TG4<TG5<TG6<TG7$, and the luminance values of the images are in the relationship of $IG1<IG2<IG3<IG4<IG5<IG6<IG7$.

(C) The color of the adjusting image is set to B, (1) a solid-blue image D31 with a gray level TB1 set as the gray level is projected, and is then measured in the range no less than 450 nm and no more than 495 nm as the wavelength range corresponding to blue. Further, (2) a solid-blue image IB2 with a gray level TB2 set as the gray level is projected, and is then measured in the range no less than 450 nm and no more than 495 nm as the wavelength range corresponding to blue. Further, (3) a solid-blue image IB3 with a gray level TB3 set as the gray level is projected, and is then measured in the range no less than 450 nm and no more than 495 nm as the wavelength range corresponding to blue. Further, (4) a solid-blue image IB4 with a gray level TB4 set as the gray level is projected, and is then measured in the range no less than 450 nm and no more than 495 nm as the wavelength range corresponding to blue. Further, (5) a solid-blue image IB5 with a gray level TB5 set as the gray level is projected, and is then measured in the range no less than 450 nm and no more than 495 nm as the wavelength range corresponding to blue. Further, (6) a solid-blue image IB6 with a gray level TB6 set as the gray level is projected, and is then measured in the range no less than 450 nm and no more than 495 nm as the wavelength range corresponding to blue. Further, (7) a solid-blue image IB7 with a gray level TB7 set as the gray level is projected, and is then measured in the range no less than 450 nm and no more than 495 nm as the wavelength range corresponding to blue.

Here, the gray levels are in the relationship of $TB1<TB2<TB3<TB4<TB5<TB6<TB7$, and the luminance values of the images are in the relationship of $IB1<IB2<IB3<IB4<IB5<IB6<IB7$.

Control Section/Processor/Estimation Value Calculation Section

The estimation value calculation section 175 retrieves the spectral imaging data and the estimation matrix M from the storage section 160, and calculates the estimation values of the spectra at second wavelength intervals shorter than the first wavelength interval based on the spectral imaging data and the estimation matrix M thus retrieved. The estimation value calculation section 175 multiplies the intensity I of the component of the wavelength X obtained from the spectral imaging data by the estimation matrix M to calculate the estimation values of the spectra at the second wavelength intervals.

Control Section/Processor/Generation Section

The generation section 177 generates a correction parameter used for the image processing by the image processing section 143 based on the estimation values of the spectra calculated by the estimation value calculation section 175. The correction parameter is used when the image processing section 143 processes the image datum input from the image interface 141. The specific generation method of the correction parameter will be described with reference to the flowchart shown in FIG. 4 described below.

Operation of Projector

Figure 4:
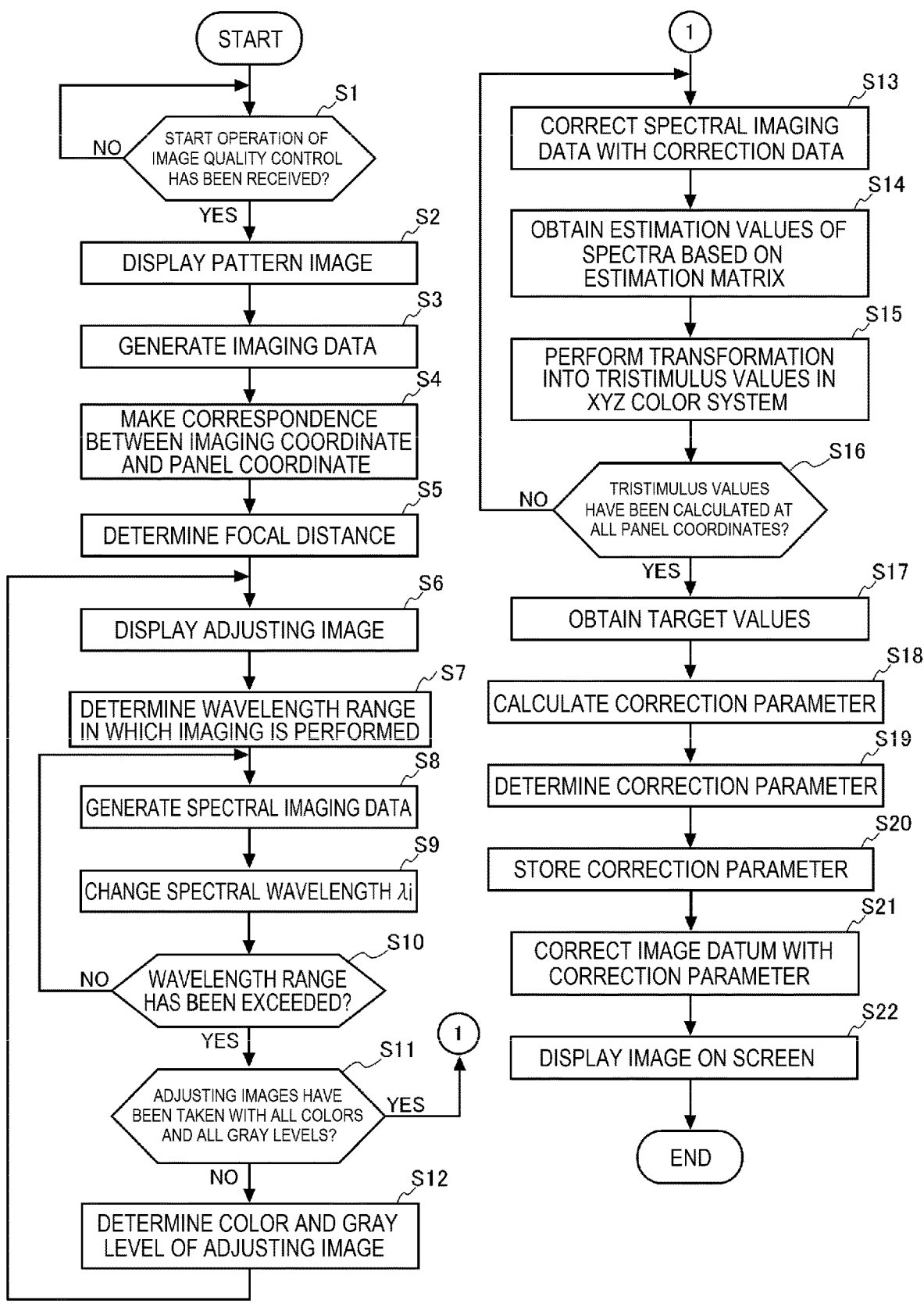
FIG. 4 is a flowchart showing an operation of the projector according to a first embodiment.

FIG. 4 is a flowchart showing an operation of the projector 100 according to the first embodiment.

The operation of the projector 100 will be described with reference to the flowchart shown in FIG. 4.

Firstly, the control section 150 determines (step S1) whether or not the operation of selecting the image quality control has been received. The control section 150 determines (step S1) whether or not the operation of selecting the image quality control has been received based on the operation signal input from the input interface 135. When the control section 150 has not received the operation of selecting the image quality control (NO in the step S1), the control section 150 stands ready to start the action until the operation is received. Further, when the control section 150 has received the operation of instructing execution of other processes, the control section 150 performs the action corresponding to the operation thus received, and then returns to the determination in the step S1.

The image quality control is an adjustment of correcting the image quality deterioration of the projection image to be displayed on the screen SC to restore the image quality to the image quality when the projector 100 has been manufactured. For example, since the light source 111 varies in characteristics due to the temperature variation, deterioration with age, and so on, it is necessary to correct the light intensity so that the desired image luminance can be obtained. Further, in the image quality control of the projector 100, there are an adjustment of correcting the tint of the screen SC and the ambient illumination to thereby correct the tint of the projection image to the tint set in advance, an adjustment of matching the tint of the projection images to be displayed by a plurality of the projectors 100, and so on. Regarding these image adjustments, it is possible to generate the correction data 167a in substantially the same procedure described below.

When the control section 150 has received the operation of selecting the image quality control (YES in the step S1), the control section 150 firstly calculates the projective transformation matrix 167b. The projective transformation matrix 167b is a matrix for transforming the panel coordinate of each of the liquid crystal panels 115 into the imaging coordinate of the spectral imaging data generated by the spectral imaging section 137. The control section 150 retrieves the pattern image datum 163 from the storage section 160, and controls the image processing section 143 and the drive section 120 to display the pattern image corresponding to the pattern image datum 163 on the screen SC (step S2).

Then, the control section 150 controls the spectral imaging section 137 to take an image of the screen SC on which the pattern image is displayed. Here, it is preferable for the imaging datum taken by the spectral imaging section 137 to be a datum taken in the state in which the spectral element 302 does not disperse the wavelength of the light. The spectral imaging section 137 generates (step S3) the imaging datum, and then outputs the imaging datum thus generated to the control section 150. The control section 150 stores the imaging datum thus input in the storage section 160.

Then, the control section 150 makes a correspondence (step S4) between the imaging coordinate and the panel coordinate.

The control section 150 retrieves the imaging datum from the storage section 160, and then analyzes the imaging datum thus retrieved to detect the marks having the predetermined shapes. When the control section 150 has detected the mark from the imaging datum, the control section 150 makes a correspondence between the pixels of the detected position of the mark and the pixels of the liquid crystal panel 115 in which the mark is drawn. In other words, the control section 150 makes a correspondence between the coordinates of the pixels in the detection position of the mark and the coordinates of the pixels of the liquid crystal panel 115 in which the mark is drawn. Further, when the control section 150 has detected the four marks from the imaging datum, the control section 150 obtains the projective transformation matrix 167b for transforming the panel coordinate of the liquid crystal panel 115 into the imaging coordinate based on the imaging coordinates of the four marks and the panel coordinates made to correspond to each other.

Although in this flowchart, there is described when processing of obtaining the projective transformation matrix 167b is performed before displaying the adjusting images on the screen SC, it is also possible to adopt a configuration in which the projective transformation matrix 167b is calculated and stored in the storage section 160 in advance. Further, although in this flowchart, there is described when the imaging coordinate and the panel coordinate are made to correspond to each other, it is also possible to adopt a configuration in which the imaging coordinate is made to correspond to a coordinate set in the pixels of the frame memory 145.

Then, the control section 150 determines (step S5) the focal distance of the spectral imaging section 137 based on field angle information of the imaging datum taken in the step S3. When the control section 150 has determined the focal distance, the control section 150 adjusts the lens position and the zoom magnification of the incident optical system 310 of the spectral imaging section 137 based on the focal distance thus determined. Further, when the spectral imaging section 137 is provided with a plurality of single focus lenses, the control section 150 selects one of the single focus lenses based on the focal distance thus determined.

Then, the control section 150 selects the color and the gray level of the adjusting image, and then retrieves the adjusting image datum 162 with the selected color and gray level from the storage section 160. When the control section 150 has retrieved the adjusting image datum 162 from the storage section 160, the control section 150 controls the image processing section 143 and the drive section 120 to display (step S6) the adjusting image corresponding to the adjusting image datum 162 on the screen SC. The step S6 corresponds to an example of a "first projection step" and a "second projection step" in the present disclosure. Here, it is preferable for the light used for the generation of the image light which the adjusting image derives from to be homogenous light homogenized in wavelength with, for example, an integrating sphere. By projecting the light homogenized in wavelength on the screen SC, it is possible to improve the accuracy of the image quality control.

Then, the control section 150 determines (step S7) the wavelength range in which the control section 150 makes the spectral imaging section 137 perform imaging based on the color of the adjusting image displayed in the step S6. When the control section 150 has determined the wavelength range, the control section 150 sets the minimum value in the wavelength range thus determined as the setting spectral wavelength $\lambda i$ to be set to the spectral element 302, and then makes the spectral imaging section 137 perform imaging to generate (step S8) the spectral imaging datum. The step S8 corresponds to an example of an "imaging step" and a "second acquisition step" in the present disclosure.

Then, the control section 150 changes (step S9) the value of the setting spectral wavelength $\lambda i$ to a value larger as much as a predetermined value, and then determines (step S10) whether or not the setting spectral wavelength $\lambda i$ has proceeded the wavelength range. When the setting spectral wavelength $\lambda i$ has not proceeded the wavelength range (NO in the step S10), the control section 150 sets the setting spectral wavelength λi to the spectral element 302, and then makes the spectral imaging section 137 perform imaging to generate (step S8) the spectral imaging datum.

Further, when the setting spectral wavelength λi has proceeded the wavelength range (YES in the step S10), the control section 150 determines (step S11) whether or not the adjusting images of all of the colors have been displayed on the screen SC at all of the gray levels and have been taken by the spectral imaging section 137. When there remains the adjusting image of a color or a gray level having not been taken by the spectral imaging section 137 (NO in the step S11), the control section 150 determines (step S12) the color and the gray level of the adjusting image to be displayed next. The control section 150 changes at least one of the color and the gray level of the adjusting image, and determines the color and the gray level thus changed as the color and the gray level of the adjusting image to be displayed next. The step S12 corresponds to an example of a "first determination step" and a "second determination step" in the present disclosure. The control section 150 retrieves the adjusting image datum 162 with the color and the gray level thus determined from the storage section 160, and then controls the image processing section 143 and the drive section 120 to display the adjusting image corresponding to the adjusting image datum 162 on the screen SC.

Further, when the control section 150 has displayed the adjusting images of all of the colors at all of the gray levels, and has generated the spectral imaging data (YES in the step S11), the control section 150 determines that the colorimetric process has been completed. The control section 150 retrieves the spectral imaging data from the storage section 160, and then corrects (step S13) the spectral imaging data thus retrieved. Firstly, the control section 150 selects one of the panel coordinates and then obtains the imaging coordinate corresponding to the panel coordinate thus selected. The control section 150 transforms the panel coordinate thus selected into the imaging coordinate using the projective transformation matrix 167b generated in the step S4. The panel coordinate thus selected is described as (xp, yp), and the imaging coordinate is described as (xc, yc). Further, the projective transformation matrix 167b is described as "Φ." The control section 150 calculates the imaging coordinate in accordance with the formula (7) described below.

$$(xc, yc) = \Phi \cdot (xp, yp) \quad (7)$$

Then, the control section 150 retrieves the correction data 167a made to correspond to the imaging coordinate thus calculated from the storage section 160, and then corrects (step S13) the spectral imaging data using the correction data 167a thus retrieved. The formula for correcting the spectral imaging data using the correction data 167a is described as the formula (8) below.

$$\text{post}(xc, yc, r, \lambda, I) = \text{pre}(xc, yc, r, \lambda, I) \cdot k(xc, yc, r, \lambda, \text{coeff}) \quad (8)$$

In the formula (8), "post(xc, yc, r, λ, I)" represents the intensity I of the component of the wavelength λ imaged in the spectral imaging data, and the value having been corrected using the correction data 167a.

Further, "pre(xc, yc, r, λ, I)" is the intensity I of the component of the wavelength X at the imaging coordinate (xc, yc) of the spectral imaging data obtained by taking the adjusting images for the R light.

Further, "k(xc, yc, r, λ, coeff)" is the correction datum 167a for correcting the component of the wavelength λ of the spectral imaging data obtained by taking the images of the R light at the imaging coordinate (xc, yc).

The formula (8) represents when correcting the intensity I of the component of the wavelength λ of the spectral imaging data obtained by taking the adjusting images of the R light, but the control section 150 performs the correction with the correction data 167a at all of the wavelengths λi with respect to the spectral imaging data obtained by taking the adjusting images of the R light, the G light, and the B light.

Then, the control section 150 multiplies the spectral imaging data having been corrected with the correction data 167a by the estimation matrix M to estimate (step S14) the spectra at the second wavelength intervals. The formula for obtaining the estimation values of the spectra at the second wavelength intervals is described as the formula (9) below.

$$\text{Spectral}(xc, yc, \lambda) = M \cdot \text{post}(xc, yc, \lambda) \quad (9)$$

In the formula (9), Spectral(xc, yc, λ) represents the estimation values of the spectra at the coordinate (xc, yc). By multiplying post(xc, yc, λ) by the estimation matrix M, it is possible to obtain the estimation values obtained by estimating the intensity I of the light at the wavelength intervals of, for example, 1 nm.

Figure 5:
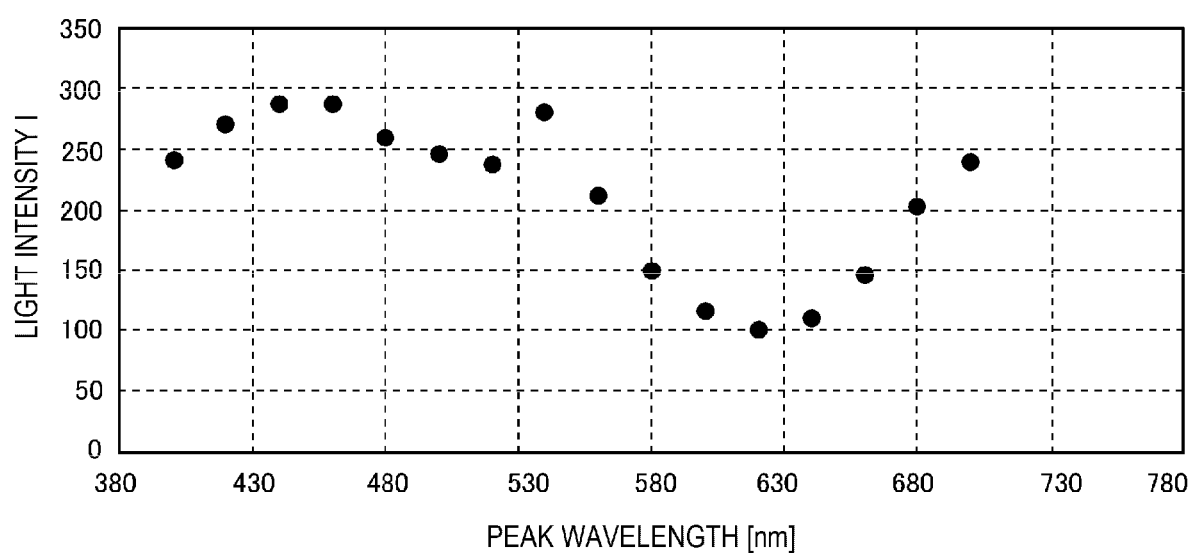
FIG. 5 is a diagram showing light intensity values of respective spectral frequencies obtained from spectral imaging data.

FIG. 5 is a diagram showing light intensity values of respective spectral frequencies obtained from the spectral imaging data. The horizontal axis in FIG. 5 represents the wavelength in nanometer, and the vertical axis represents the light intensity I. The filled circles shown in FIG. 5 represent the values obtained from the spectral imaging data. In FIG. 5, there are shown the light intensity values obtained from the spectral imaging data taken at the spectral wavelength intervals of 20 nm.

Figure 6:
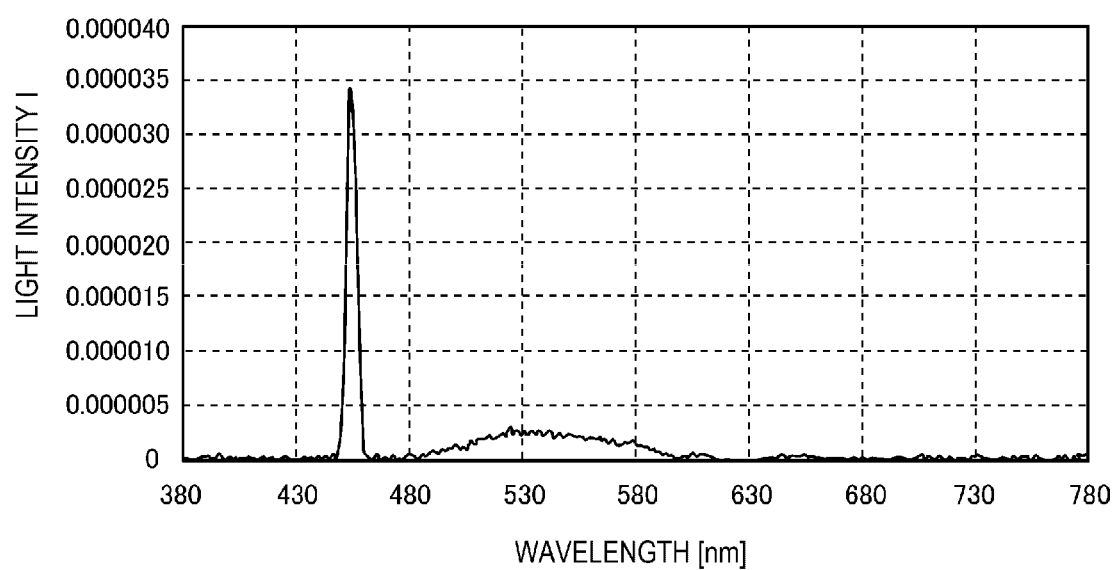
FIG. 6 is a diagram showing estimate values of the spectrum at second wavelength intervals.

Further, FIG. 6 is a diagram showing the estimation values of the spectra calculated by the control section 150. The horizontal axis in FIG. 6 represents the wavelength in nanometer, and the vertical axis represents the light intensity I. In FIG. 6, there are shown the estimation values of the spectra obtained at the wavelength intervals of 1 nm.

Then, the control section 150 converts (step S15) the estimation values of the spectra into the tristimulus values X, Y, and Z in the XYZ color system based on the estimation values of the spectra and the CIE 1931 XYZ color-matching functions x(λ), y(λ), and z(λ). The conversion equations to the tristimulus values X, Y, and Z are described as the formulas (10a), (10b), and (10c).

$$x(xp, yp) = \int \text{Spectral}(xc, yc, \lambda) x(\lambda) d\lambda \quad (10a)$$

$$Y(xp, yp) = \int \text{Spectral}(xc, yc, \lambda) y(\lambda) d\lambda \quad (10b)$$

$$Z(xp, yp) = \int \text{Spectral}(xc, yc, \lambda) z(\lambda) d\lambda \quad (10c)$$

In the formulas (10a), (10b), and (10c), X(xp, yp), Y(xp, yp), and Z(xp, yp) show the stimulus values at the panel coordinate (xp, yp) made to correspond to the imaging coordinate (xc, yc). The control section 150 stores the tristimulus values X(xp, yp), Y(xp, yp), and Z(xp, yp) thus calculated in the storage section 160. Hereinafter, X(xp, yp), Y(xp, yp), and Z(xp, yp) are collectively described as Fin_XYZ(xp, yp).

Then, the control section 150 determines (step S16) whether or not the tristimulus values Fin_XYZ(xp, yp) have been calculated at all of the panel coordinates in the liquid crystal panel 115. When the control section 150 has not calculated the tristimulus values Fin_XYZ(xp, yp) at all of the panel coordinates (NO in the step S16), the control section 150 returns to the step S13 to select the panel coordinate, and then corrects the spectral imaging datum with the correction datum 167a corresponding to the panel coordinate thus selected.

Further, when the control section 150 has calculated the tristimulus values Fin_XYZ(xp, yp) at all of the panel coordinates (YES in the step S16), the control section 150 obtains (step S17) target values of the image quality control from the storage section 160. Here, there is described when the tristimulus values obtained by converting the spectrum colorimetric data measured by the spectrum measurement device with the formulas (10a), (10b), and (10c) described above are used as the target values. Besides the above, the tristimulus values obtained based on the adjusting images corrected with the correction parameter obtained by the previous image quality control can also be set as the target values of the image quality control. In other words, the gray levels of the adjusting images are corrected with the correction parameter obtained in the previous image quality control, the adjusting images with the gray levels corrected is displayed on the screen SC, and is then taken by the spectral imaging section 137, and thus, the spectral imaging data are generated. Subsequently, the tristimulus values Fin_XYZ(xp, yp) are obtained in accordance with the procedure of the steps S13 through S15 described above, and then the tristimulus values thus obtained are set as the target values of the image quality control.

Then, the control section 150 obtains an inverse function of the tristimulus values Fin_XYZ(xp, yp) calculated in the step S15. Further, the control section 150 multiplies the target values obtained in the step S17 by the inverse function thus obtained to calculate a control ratio of each of the colors of R, and B. The target values obtained in the step S17 are described as Target_XYZ. The computation formula of the correction parameter will be described as the formula (11) below.

$$Coef\_RGB(xp, yp) = Fin\_XYZ(xp, yp)^{-1} \cdot Target\_XYZ \quad (11)$$

Then, the control section 150 obtains the correction data 167a for correcting the gray levels of the image data with reference to a gamma correction table. The gamma correction table is a table stored in the storage section 160, and has the gray levels of the image data and the transmittance values of the liquid crystal panel 115 registered so as to correspond to each other. The control section 150 obtains the gray levels of the image data corresponding to the transmittance values of the liquid crystal panel 115 when displaying the adjusting images on the screen SC in the step S6 with reference to the gamma correction table. Further, the control section 150 obtains the gray levels of the image data corresponding to the transmittance values of the liquid crystal panel 115 based on the control ratio thus calculated with reference to the gamma correction table. The control section 150 calculates (step S18) a difference between the gray levels of the image data thus obtained as the correction parameter for correcting the image data. The correction parameter is a parameter for correcting the ratio between RGB of each of the pixels constituting the image data. The step S18 corresponds to an example of a "generation step" in the present disclosure.

It is possible for the control section 150 to generate the correction parameter by a pixel constituting the liquid crystal panel 115 as a unit, or generate the correction parameter by a plurality of pixels as a unit. When generating the correction parameter by the plurality of pixels as a unit, the correction parameter of the pixels for which the correction parameter has not been generated can be obtained by, for example, an interpolation calculation using linear interpolation.

Then, the control section 150 determines (step S19) whether or not the correction parameter thus calculated is a valid datum. For example, the control section 150 calculates a difference between the correction parameter calculated in the previous image quality control and the value of the correction parameter calculated this time, and then compares the difference between the values thus calculated with a first threshold value and a second threshold value prepared in advance. When the difference between the values thus calculated is larger than the first threshold value, the control section 150 determines that the correction parameter calculated this time is invalid. Further, when the difference between the values thus calculated is smaller than the second threshold value, the control section 150 also determines that the correction parameter calculated this time is invalid. It should be noted that the second threshold value is a threshold value smaller in amount than the first threshold value.

When the correction parameter thus calculated is a valid datum, the control section 150 stores (step S20) the correction parameter thus calculated in the storage section 160. Further, when the correction parameter thus calculated is not a valid datum, it is possible for the control section 150 to perform the process again from the step S2 or S6.

When the supply of the image signal from the image supply device 200 begins, the control section 150 retrieves the correction parameter from the storage section 160, and then outputs the correction parameter to the image processing section 143. When the image interface 141 begins the reception of the image signal, and the image datum is input from the image interface 141, the image processing section 143 develops the image datum thus input in the frame memory 145. The image processing section 143 corrects (step S21) the image datum using the correction parameter input from the control section 150. The step S21 corresponds to an example of a "correction step" in the present disclosure.

The image processing section 143 outputs the image datum on which the image processing has been completed to the light modulation device drive circuit 123. The light modulation device drive circuit 123 generates the drive signal based on the image datum input from the image processing section 143, drives the liquid crystal panels 115 based on the drive signal thus generated to thereby draw the images on the liquid crystal panels 115. By the light emitted from the light source 111 passing through the liquid crystal panels 115, the image light corresponding to the image represented by the image datum is generated, and the image light thus generated is projected (step S22) on the screen SC by the optical unit 117.

As described hereinabove, the projector 100 according to the first embodiment is provided with the projection section 110, the spectral imaging section 137, and the control section 150. The spectral imaging section 137 is provided with the imaging element 303 and the spectral element 302. The control section 150 controls the projection section 110 and the spectral imaging section 137.

The control section 150 sets the first color and the first gray level as the color and the gray level of the adjusting image, and makes the projection section 110 project the adjusting image corresponding to the first color and the first gray level thus set. Further, the control section 150 sets the first measurement condition corresponding to the first color to the spectral imaging section 137, and makes the spectral imaging section 137 take the adjusting image projected by the projection section 110 to obtain the spectral imaging datum.

Further, the control section 150 sets the first color and the second gray level as the color and the gray level of the adjusting image, and makes the projection section 110 project the adjusting image corresponding to the first color and the second gray level thus set. Further, the control section 150 sets the first measurement condition corresponding to the first color to the spectral imaging section 137, and makes the spectral imaging section 137 take the adjusting image projected by the projection section 110 to obtain the spectral imaging datum.

Further, the control section 150 sets the second color and the third gray level as the color and the gray level of the adjusting image, and makes the projection section 110 project the adjusting image corresponding to the second color and the third gray level thus set. The control section 150 sets the second measurement condition corresponding to the second color to the spectral imaging section 137, and makes the spectral imaging section 137 take the adjusting image projected by the projection section 110 to obtain the spectral imaging datum.

Further, the control section 150 sets the second color and the fourth gray level as the color and the gray level of the adjusting image, and makes the projection section 110 project the adjusting image corresponding to the second color and the fourth gray level thus set. Further, the control section 150 sets the second measurement condition corresponding to the second color to the spectral imaging section 137, and makes the spectral imaging section 137 take the adjusting image projected by the projection section 110 to obtain the spectral imaging datum.

Therefore, in the present embodiment, it is possible to set the measurement condition corresponding to the color of the adjusting image in the spectral imaging section to make the spectral imaging section generate the spectral imaging data while changing the color and the gray level of the adjusting image to be displayed on the screen SC. Therefore, it is possible to improve the accuracy of the colorimetry to improve the accuracy of the color correction of the image to be projected by the projector.

Further, the control section 150 makes the spectral imaging section 137 perform imaging in each of the conditions of the first color and the first gray level, the first color and the second gray level, the second color and the third gray level, and the second color and the fourth gray level thus obtained to obtain the spectral imaging data. The correction parameter for correcting the image datum which the image to be projected by the projection section 110 derives from is generated based on the plurality of spectral imaging data thus obtained. Therefore, it is possible to accurately perform the color correction of the image based on the colorimetric result.

The control section 150 sets the wavelength range corresponding to the color represented by the first color to the imaging range as the first measurement condition, and makes the spectral imaging section 137 perform imaging while changing the spectral wavelength of the spectral element 302 at the first wavelength intervals. Then, the control section 150 obtains the intensity of the light corresponding to the spectral wavelength as the spectral imaging datum.

Further, the control section 150 sets the wavelength range corresponding to the color represented by the second color to the imaging range as the second measurement condition, and makes the spectral imaging section 137 perform imaging while changing the spectral wavelength of the spectral element 302 at the first wavelength intervals. Then, the control section 150 obtains the intensity of the light corresponding to the spectral wavelength as the spectral imaging datum.

Therefore, it is possible to measure the intensity of the light at the first wavelength intervals with respect to a plurality of different colors.

Further, the control section 150 calculates the estimation values of the spectra at the second wavelength intervals shorter than the first wavelength interval based on the intensity of the light at the first wavelength intervals obtained using the spectral imaging data and the estimation matrix M used for the estimation of the spectra.

It is possible to calculate the estimation values of the spectra at the second wavelength intervals shorter than the first wavelength interval imaged by the spectral imaging section 137, and thus, it is possible to accurately perform the colorimetry of the image. Further, since it is possible to perform imaging by the spectral imaging section 137 at the first wavelength intervals longer than the second wavelength interval, it is possible to shorten the time necessary to generate the spectral imaging data. Further, by calculating the correction parameter for correcting the image datum based on the estimation values of the spectra thus calculated, it is possible to accurately perform the color correction of the image.

Further, the estimation matrix M is calculated based on the spectral imaging data taken by the spectral imaging section 137. The spectral imaging data generated by the spectral imaging section 137 includes an error due to the optical characteristics of the optical component provided to the projector 100. However, by calculating the estimation matrix M based on the spectral imaging data generated by the spectral imaging section 137, and the spectrum colorimetric data measured by the dedicated spectrum measurement device, it is possible to correct the optical characteristics to obtain the accurate estimation values of the spectra.

Further, the estimation matrix M has the determinant of minimizing the square error of the measurement data obtained by measuring the adjusting image displayed on the screen SC at the second wavelength intervals by the dedicated spectrum measurement device and estimated imaging element values of the spectra obtained based on the spectral imaging data.

Therefore, it is possible to suppress the error caused in the spectral imaging data generated by the spectral imaging section 137 to calculate the accurate estimation values of the spectra.

Further, the spectral imaging section 137 changes the distance between the pair of reflecting films 304, 305 opposed to each other and provided to the spectral element 302 to change the spectral wavelength of the spectral element 302, and then outputs the spectral imaging data obtained at the first wavelength intervals.

Therefore, the setting accuracy of the spectral wavelength of the spectral element 302 can be improved.

As described hereinabove, the projector 100 according to the first embodiment performs the colorimetry with the spectral imaging section 137 provided with the imaging element 303 and the spectral element 302.

The projector 100 executes each of the steps of the imaging step, the calculation step, and the generation step.

In the imaging step, the adjusting image displayed on the screen SC by the projection section 110 is taken by the spectral imaging section 137 while changing the spectral wavelength $\lambda i$ of the spectral element 302 at the first wavelength intervals within the wavelength range set based on the adjusting image to thereby generate the spectral imaging data.

In the calculation step, the estimation values of the spectra at the second wavelength intervals shorter than the first wavelength interval are calculated based on the spectral imaging data generated in the imaging step and the estimation matrix M used for the estimation of the spectra.

In the generation step, the correction parameter for correcting the image datum which the image to be displayed derives from is generated based on the estimation values of the spectra calculated in the calculation step.

Therefore, it is possible to calculate the estimation values of the spectra at the second wavelength intervals shorter than the first wavelength interval imaged by the spectral imaging section 137, and thus, it is possible to accurately perform the colorimetry of the image. Further, since it is possible to perform imaging by the spectral imaging section 137 at the first wavelength intervals longer than the second wavelength interval, it is possible to shorten the time necessary to generate the spectral imaging data. Further, by calculating the correction parameter for correcting the image datum based on the estimation values of the spectra thus calculated, it is possible to accurately perform the correction of the image.

The estimation matrix M is calculated based on the spectral imaging data taken by the spectral imaging section 137. Although the spectral imaging data generated by the spectral imaging section 137 includes an error due to the optical characteristics of the optical component provided to the projector 100, by calculating the estimation matrix M based on the spectral imaging data generated by the spectral imaging section 137, and the spectrum colorimetric data measured by the spectrum measurement device, it is possible to correct the optical characteristics to obtain the accurate estimation values of the spectra.

Further, the estimation matrix M has the determinant of minimizing the square error of the measurement data obtained by measuring the adjusting image displayed on the screen SC at the second wavelength intervals by the spectrum measurement device and the estimation values of the spectra obtained based on the spectral imaging data.

Therefore, it is possible to suppress the error caused in the spectral imaging data generated by the spectral imaging section 137 to calculate the accurate estimation values of the spectra.

In the imaging step, the spectral imaging section 137 changes the distance between the pair of reflecting films 304, 305 opposed to each other and provided to the spectral element 302 to change the spectral wavelength of the spectral element 302, and then outputs the spectral imaging data obtained at the first wavelength intervals.

Therefore, the setting accuracy of the spectral wavelength of the spectral element 302 can be improved.

In the calculation step, the estimation values are calculated based on the spectral imaging data corrected using the correction data 167a for correcting the sensitivity distribution caused in the imaging element 303, and the estimation matrix M.

Therefore, it is possible to reduce the sensitivity distribution caused in the imaging element 303.

Second Embodiment

A second embodiment will be described with reference to the accompanying drawings. The second embodiment is an embodiment corresponding to a "display system" and an "image correction method."

The second embodiment is an embodiment of a display system 1 in which a plurality of the projectors 100 is coupled to each other with the cable 3 to perform data communication between the projectors 100. In the second embodiment, the data communication is performed between the plurality of projectors 100 to perform color matching of the images to be displayed by the respective projectors 100. It should be noted that there is described in the second embodiment when the plurality of projectors 100 is coupled to each other with wire, but the coupling between the projectors 100 can also be achieved wirelessly.

FIG. 7 is a system configuration diagram of the display system 1.

The display system 1 is provided with the two projectors 100. The projector 100 for displaying an image on the left part of the screen SC viewed from the direction opposed to the screen SC is described as a projector 100A, and the projector 100 for displaying an image on the right part of the screen SC is described as a projector 100B. The projector 100A and the projector 100B respectively display the images on the left part and the right part of the screen SC to thereby constitute a multi-projection system for displaying a single image. In FIG. 7, there is shown a configuration in which the display system 1 is provided with the two projector 100, but the number of the projectors 100 coupled is not limited to two, and it is possible to couple n projectors 100 to each other. It should be noted that "n" denotes a natural number equal to or larger than 2.

The configurations of the projector 100A and the projector 100B are substantially the same as the configuration of the projector 100 shown in FIG. 1, and therefore, the description of the configurations of the projector 100A and the projector 100B will be omitted. Further, in the constituents of the projector 100 shown in the block diagram in FIG. 1, the constituents of the projector 100A are each attached with a symbol of "A," and the constituents of the projector 100B are each attached with a symbol of "B." For example, the control section 150 of the projector 100A is described as a "control section 150A," and the control section 150 of the projector 100B is described as a "control section 150B." The projector 100A and the projector 100B are each coupled to the image supply device 200 via the cable 3, and each display an image based on the image signal supplied from the image supply device 200 on the screen SC.

The projector 100A operates as a master machine, and the projector 100B operates as a slave machine. In other words, the projector 100B operates in accordance with the control by the projector 100A. The projector 100A as the master machine instructs the projector 100B to calculate the tristimulus values described in the first embodiment, or generates the correction parameter and then transmits the correction parameter to the projector 100B.

An area in which the projector 100A projects the image light is referred to as a projection area 10, and an area in which the projector 100B projects the image light is referred to as a projection area 20. The projection area 10 and the projection area 20 partially overlap each other.

In the second embodiment, the projector 100A corresponds to an example of a "first display device" and a "first projector" in the present disclosure, and the projector 100B corresponds to an example of a "second display device" and a "second projector" in the present disclosure. Further, the projection section 110A corresponds to an example of a "first projection section" and a "first display section" in the present disclosure, and the projection section 110B corresponds to an example of a "second projection section" and a "second display section" in the present disclosure. Further, the spectral imaging section 137A corresponds to an example of a "first spectral imaging section" in the present disclosure, and the spectral imaging section 137B corresponds to an example of a "second spectral imaging section"

in the present disclosure. Further, the imaging element 303A corresponds to an example of a "first imaging element" in the present disclosure, and the imaging element 303B corresponds to an example of a "second imaging element" in the present disclosure. The spectral element 302A corresponds to a "first spectral element" in the present disclosure, and the spectral element 302B corresponds to a "second spectral element" in the present disclosure. Further, the control section 150A corresponds to an example of a "first control section" in the present disclosure, and the control section 150B corresponds to an example of a "second control section" in the present disclosure. Further, the estimation value calculation section 175A corresponds to an example of a "first estimation value calculation section" in the present disclosure, and the estimation value calculation section 175B corresponds to an example of a "second estimation value calculation section" in the present disclosure. Further, the storage section 160A corresponds to an example of a "first storage section" in the present disclosure, and the storage section 160B corresponds to an example of a "second storage section" in the present disclosure.

Figure 8:
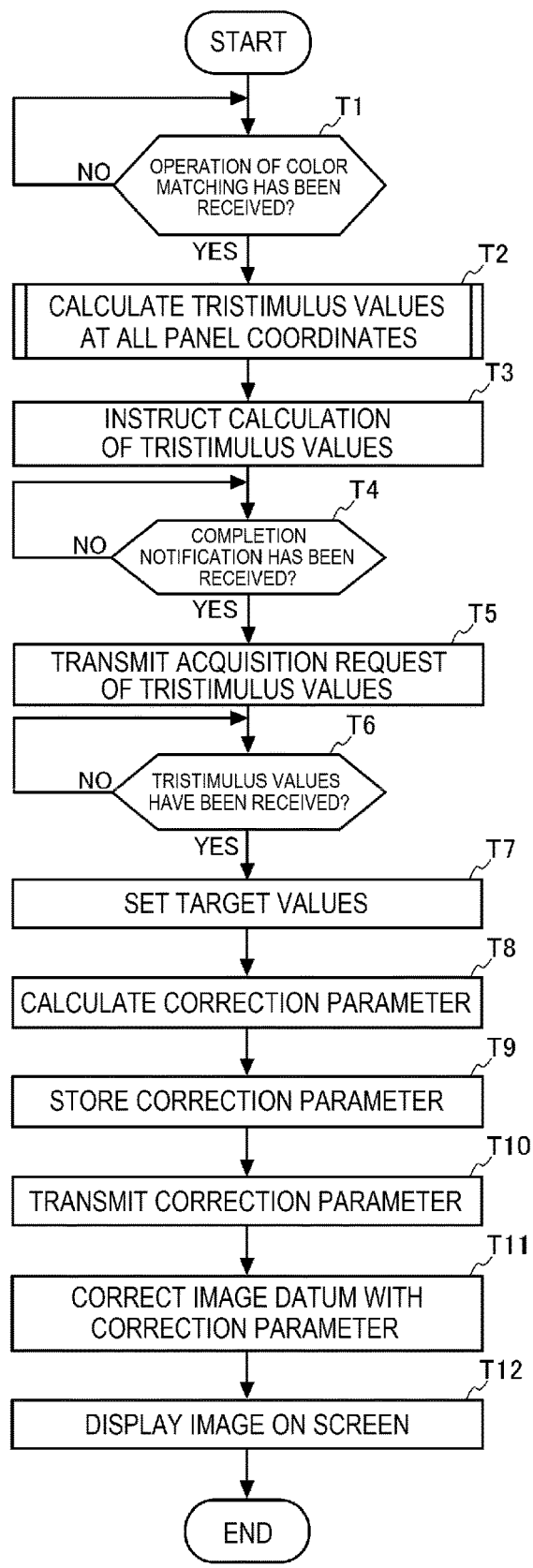
FIG. 8 is a flowchart showing an operation of a projector as a master machine.

FIG. 8 is a flowchart showing the operation of the projector 100A.

The operation of the projector 100A will be described with reference to the flowchart shown in FIG. 8.

The control section 150A determines (step T1) whether or not an operation of selecting the color matching has been received. The control section 150A determines (step T1) whether or not the operation of selecting the color matching has been received based on the operation signal input from the input interface 135A. When the control section 150A has not received the operation of selecting the color matching (NO in the step T1), the control section 150A stands ready to start the action until the operation is received. Further, when the control section 150A has received the operation of instructing execution of other processes, the control section 150 performs the action corresponding to the operation thus received, and then returns to the determination in the step T1.

When the control section 150A has received the operation of selecting the color matching (YES in the step T1), the control section 150A performs the process of the steps S2 through S16 shown in FIG. 4 to calculate (step T2) the tristimulus values at all of the panel coordinates in the liquid crystal panels 115A. The step T2 includes a "first determination step," a "first projection step," and a "first acquisition step" in the present disclosure.

Then, the control section 150A transmits a signal for instructing the calculation of the tristimulus values to the projector 100B to thereby instruct (step T3) the projector 100B to calculate the tristimulus values. When the control section 150A instructs the projector 100B to calculate the tristimulus values, the control section 150A determines (step T4) whether or not a signal for giving notice of the completion of the calculation of the tristimulus values has been received from the projector 100B. When the control section 150A has not received the signal for giving notice of the completion (NO in the step T4), the control section 150A waits until the signal is received.

Further, when the control section 150A has received a signal for giving notice of the completion from the projector 100B (YES in the step T4), the control section 150A transmits (step T5) an acquisition request of the tristimulus values thus calculated to the projector 100B. The control section 150A determines (step T6) whether or not the tristimulus values have been received from the projector 100B. When the control section 150A has not received the tristimulus values from the projector 100B (NO in the step T6), the control section 150A waits until the tristimulus values are received.

Further, when the control section 150A has received the tristimulus values from the projector 100B, the control section 150A stores the tristimulus values thus received in the storage section 160A. Subsequently, the control section 150A sets a target value of the color matching (step T7). The control section 150A compares the tristimulus values received from the projector 100B and the tristimulus values generated by the control section 150A with each other to identify the panel coordinate the lowest in luminance. For example, it is also possible for the control section 150A to compare the Y values having the luminance information out of the tristimulus values to identify the panel coordinate to which the smallest one of the Y values is made to correspond. Further, when there exists a plurality of the panel coordinates the lowest in luminance, it is possible to identify the panel coordinate the lowest in luminance by comparing also other stimulus values such as the X value or the Z value.

When the control section 150A has identified the panel coordinate the lowest in luminance, the control section 150A sets the tristimulus values of the panel coordinate the lowest in luminance thus identified as the target values. The control section 150A calculates the correction parameter for correcting the tristimulus values of other panel coordinates with the formula (11) described above defining the target values thus set as Target_XYZ. Further, the control section 150A also generates (step T8) the correction parameter using the formula (11) similarly with respect to the tristimulus values made to correspond to each of the panel coordinates of the projector 100B received from the projector 100B. The step T8 corresponds to an example of a "generation step" in the present disclosure.

The control section 150A generates the correction parameter with respect to each of the panel coordinates of the projector 100A, and then stores (step T9) the correction parameters thus generated in the storage section 160A. The correction parameters generated here each correspond to an example of a "first correction parameter" in the present disclosure. Further, the control section 150A also generates the correction parameter with respect to each of the panel coordinates of the projector 100B, and then transmits (step T10) the correction parameters thus generated to the projector 100B. The correction parameters generated here each correspond to an example of a "second correction parameter" in the present disclosure.

Subsequently, when the supply of the image signal from the image supply device 200 has started, the control section 150A makes (step T11) the image processing section 143A correct the image datum using the correction parameters thus generated. Then, the control section 150A makes the projection section 110A project the image light based on the image datum having been corrected on the screen SC. Thus, the image based on the image datum the tint of which has been corrected with the correction parameters is displayed (step T12) on the screen SC.

Figure 9:
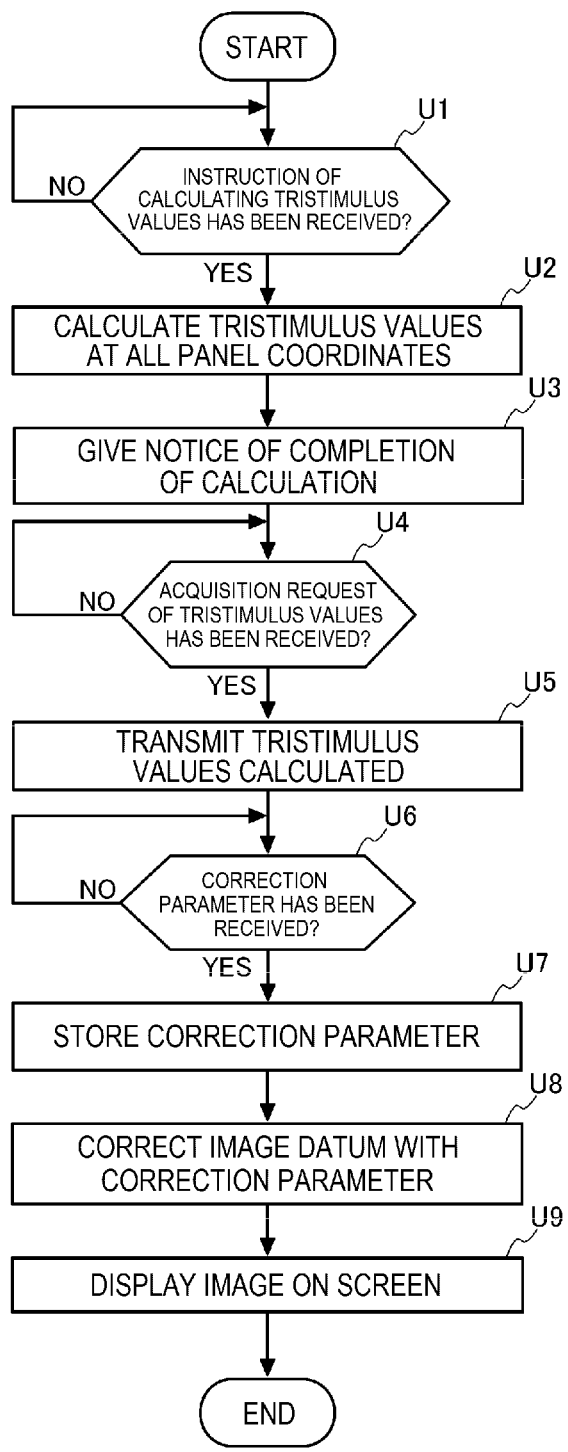
FIG. 9 is a flowchart showing an operation of a projector as a slave machine.

FIG. 9 is a flowchart showing the operation of the projector 100B.

The operation of the projector 100B will be described with reference to the flowchart shown in FIG. 9.

The control section 150B determines (step U1) whether or not a signal for instructing the calculation of the tristimulus values have been received from the projector 100A. When the control section 150B has not received the signal for instructing the calculation (NO in the step U1), the control section 150B stands ready to start the process until the signal is received.

Further, when the control section 150B has received the signal for instructing the calculation of the tristimulus values from the projector 100A (YES in the step U1), the control section 150B performs the process of the steps S2 through S16 shown in FIG. 4 to calculate (step U2) the tristimulus values at all of the panel coordinates in the liquid crystal panels 115B. When the calculation of the tristimulus values is completed, the control section 150B transmits (step U3) the signal for giving notice of the completion of the calculation to the projector 100A. The step U2 includes a "second determination step," a "second projection step," and a "second acquisition step" in the present disclosure.

Then, the control section 150B determines (step U4) whether or not the acquisition request of the tristimulus values has been received from the projector 100A. When the control section 150B has not received the acquisition request of the tristimulus values (NO in the step U4), the control section 150B waits until the acquisition request is received.

When the control section 150B has received the acquisition request of the tristimulus values (YES in the step U4), the control section 150B transmits (step U5) the tristimulus values calculated for each of the panel coordinates to the projector 100A. Subsequently, the control section 150B determines (step U6) whether or not the correction parameters have been received from the projector 100A. When the control section 150B has not received the correction parameters (NO in the step U6), the control section 150B waits until the correction parameters are received.

When the control section 150B has received the correction parameters from the projector 100A (YES in the step U6), the control section 150B stores (step U7) the correction parameters thus received in the storage section 160B. Subsequently, when the supply of the image signal from the image supply device 200 has started, the control section 150B makes (step U8) the image processing section 143B correct the image datum using the correction parameters thus generated. Then, the control section 150B makes the projection section 110B project the image light based on the image datum having been corrected on the screen SC. Thus, the image based on the image datum the tint of which has been corrected with the correction parameters is displayed (step U9) on the screen SC.

As described hereinabove, the display system 1 according to the second embodiment is provided with the projector 100A and the projector 100B.

The projector 100A is provided with the projection section 110A, the spectral imaging section 137A, the control section 150A, the storage section 160A, and the estimation value calculation section 175A.

The projection section 110A projects the image light on the screen SC to display the adjusting image on the screen SC.

The spectral imaging section 137A is provided with the imaging element 303A and the spectral element 302A, and takes the adjusting images to output the spectral imaging data.

The control section 150A determines the color and the gray level of the adjusting image to be projected by the projection section 110A, and then makes the projection section 110A project the adjusting image corresponding to the color and the gray level thus determined. Further, the control section 150A sets a measurement condition determined based on the color of the adjusting image thus determined to the spectral imaging section 137A, and makes the spectral imaging section 137A take the adjusting image projected by the projection section 110A to obtain the spectral imaging datum.

The projector 100B is provided with the projection section 110B, the spectral imaging section 137B, the control section 150B, the storage section 160B, and the estimation value calculation section 175B.

The projection section 110B projects the image light on the screen SC to display the adjusting image on the screen SC.

The spectral imaging section 137B is provided with the imaging element 303B and the spectral element 302B, and takes the adjusting images to output the spectral imaging data.

The control section 150B determines the color and the gray level of the adjusting image to be projected by the projection section 110B, and then makes the projection section 110B project the adjusting image corresponding to the color and the gray level thus determined. Further, the control section 150B sets a measurement condition determined based on the color of the adjusting image thus determined to the spectral imaging section 137B, and makes the spectral imaging section 137B take the adjusting image projected by the projection section 110B to obtain the spectral imaging datum.

Therefore, in the present embodiment, it is possible to accurately perform the colorimetry of the adjusting images projected by the projector 100A and the colorimetry of the adjusting images projected by the projector 100B. Further, it is possible to accurately perform the color matching between the image to be displayed by the projector 100A and the image to be displayed by the projector 100B based on the colorimetric result of the adjusting images. Further, the projector 100A and the projector 100B are capable of calculating the tristimulus values respectively with the spectral imaging section 137A and the spectral imaging section 137B, and it is possible to accurately perform the color matching between the image to be displayed by the projector 100A and the image to be displayed by the projector 100B without transmission and reception of the correction parameters.

The embodiment described above is a preferred embodiment of the present disclosure. It should be noted that the present disclosure is not limited to the embodiment, but can be implemented with a variety of modifications within the scope or the spirit of the present disclosure.

For example, in the embodiment described above, the description is presented citing when displaying the monochromatic images of each of the colors of R, G, and B as the adjusting images as an example, but it is also possible to adopt a configuration of including an R area, a G area, and a B area in one adjusting image.

As described hereinabove, the display system 1 according to the second embodiment is provided with the projector 100A and the projector 100B.

The projector 100A is provided with the projection section 110A, the spectral imaging section 137A, the control section 150A, the storage section 160A, and the estimation value calculation section 175A.

The projection section 110A projects the image light on the screen SC to display the adjusting image on the screen SC.

The spectral imaging section 137A is provided with the imaging element 303A and the spectral element 302A, and takes the adjusting images to output the spectral imaging data.

The control section 150A sets the spectral wavelength of the spectral element 302A at the first wavelength intervals within the wavelength range set based on the adjusting image, and makes the spectral imaging section 137A generate the imaging data.

The storage section 160A stores the estimation matrix M used for the estimation of the spectra.

The estimation value calculation section 175A calculates the estimation values of the spectra at the second wavelength intervals shorter than the first wavelength interval based on the spectral imaging data output by the spectral imaging section 137A and the estimation matrix M.

The projector 100B is provided with the projection section 110B, the spectral imaging section 137B, the control section 150B, the storage section 160B, and the estimation value calculation section 175B.

The projection section 110B projects the image light on the screen SC to display the adjusting image on the screen SC.

The spectral imaging section 137B is provided with the imaging element 303B and the spectral element 302B, and takes the adjusting images to output the spectral imaging data.

The control section 150B sets the spectral wavelength of the spectral element 302B at the first wavelength intervals within the wavelength range set based on the adjusting image, and makes the spectral imaging section 137B generate the imaging data.

The storage section 160B stores the estimation matrix M used for the estimation of the spectra.

The estimation value calculation section 175B calculates the estimation values of the spectra at the second wavelength intervals shorter than the first wavelength interval based on the spectral imaging data output by the spectral imaging section 137B and the estimation matrix M.

Further, the control section 150A generates the correction parameters for correcting the image datum which the image to be displayed by the projector 100A derives from based on the estimation values of the spectra calculated by the estimation value calculation section 175A and the estimation values of the spectra calculated by the estimation value calculation section 175B. Further, the control section 150A generates the correction data 167a for correcting the image datum which the image to be displayed by the projector 100B derives from.

Therefore, it is possible to perform the color matching between the image displayed by the projector 100A and the image displayed by the projector 100B.

Third Embodiment

Figure 10:
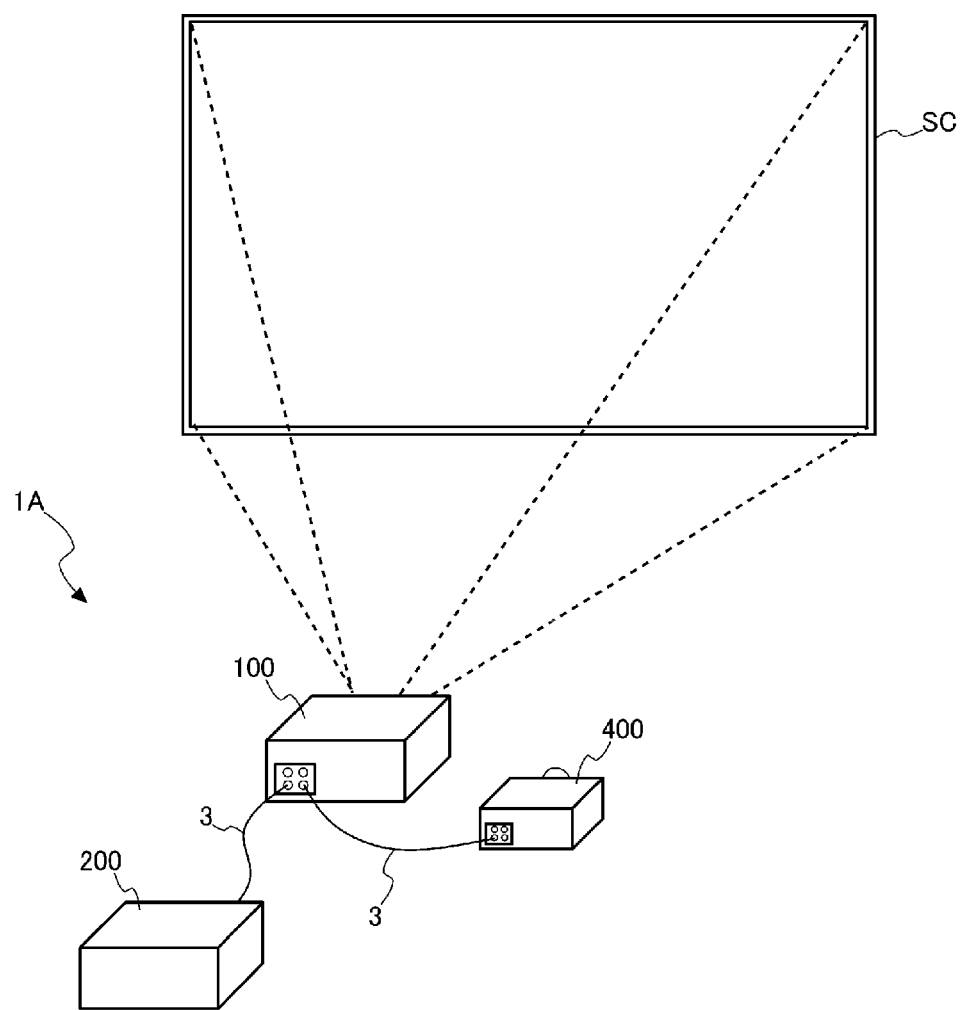
FIG. 10 is a system configuration diagram according to a third embodiment.

FIG. 10 is a diagram showing a system configuration in a third embodiment.

In the first embodiment described above, there is described the method of correcting the tint of the image using the spectral imaging section 137 installed in the projector 100. In the third embodiment, there will be described a configuration of a display system 1A in which a colorimetric device 400 provided with a spectral imaging section 420 is disposed separately from a projector 100C.

The projector 100C displays the adjusting images on the screen SC, and the colorimetric device 400 takes the adjusting images thus displayed with the spectral imaging section 420 to generate the spectral imaging data. Generation of the correction parameters can be performed by the projector 100C, or can also be performed by the colorimetric device 400. It is possible for the colorimetric device 400 to transmit the spectral imaging data thus generated to the projector 100C, or to generate the correction parameters based on the spectral imaging data and then transmit the correction parameters thus generated to the projector 100C. In the present embodiment, there is described when the colorimetric device 400 generates the correction parameters and transmits the correction parameters to the projector 100C.

Figure 11:
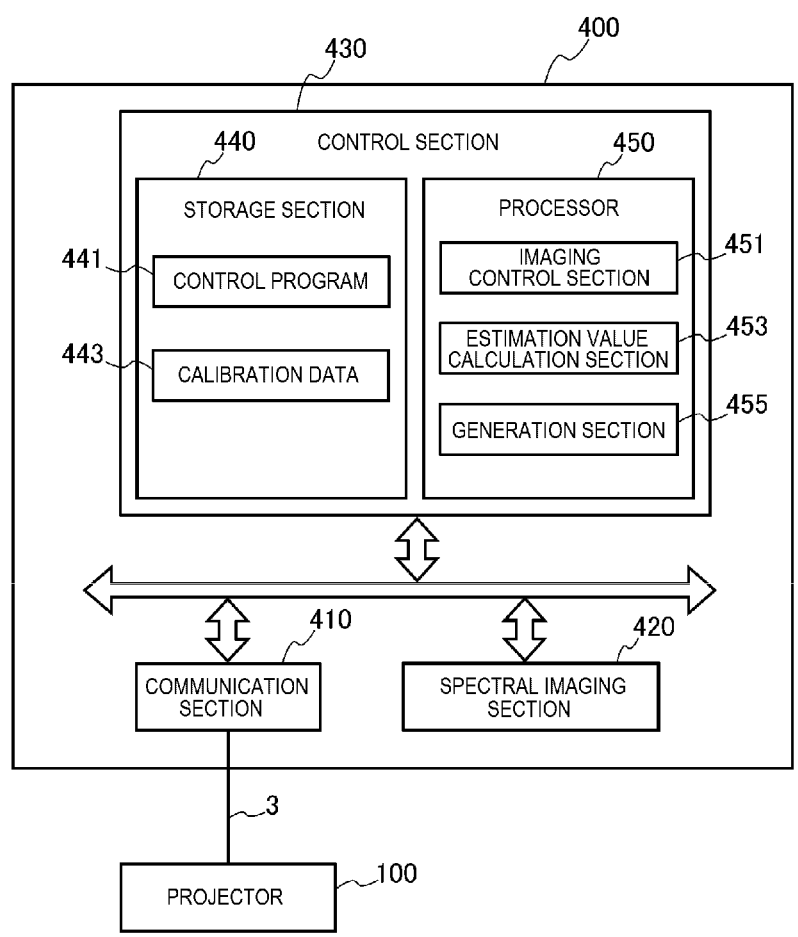
FIG. 11 is a block diagram showing a configuration of a colorimetric device.

FIG. 11 is a block diagram showing a configuration of the colorimetric device 400.

The colorimetric device 400 is provided with a communication section 410, a spectral imaging section 420, and a control section 430.

The communication section 410 is coupled to the projector 100C via the cable 3, and mutually performs data communication with the projector 100C. Although in FIG. 11, there is shown when coupling the colorimetric device 400 and the projector 100C to each other with the cable 3, it is also possible to wirelessly couple the colorimetric device 400 and the projector 100C to each other.

The spectral imaging section 420 is provided with the same configuration as that of the spectral imaging section 137 of the projector 100 shown in FIG. 1 and FIG. 2. The description of the detail of the configuration of the spectral imaging section 420 will be omitted. The spectral imaging section 420 takes the adjusting images while changing the spectral wavelength Xi in accordance with the control by the control section 430, and then outputs the spectral imaging data. The colorimetric device 400 is installed at a position where an image of a range including the screen SC can be taken.

The control section 430 is provided with a storage section 440 and a processor 450. The storage section 440 stores a control program 441 and calibration data 443. The calibration data 443 are the same as the calibration data 167 in the first embodiment.

Further, the processor 450 executes the control program 441 to function as an imaging control section 451, an estimation value calculation section 453, and a generation section 455.

The imaging control section 451 controls the spectral imaging section 420 to make the spectral imaging section 420 generate the imaging data. Further, the imaging control section 451 receives color information representing the color of the adjusting image projected on the screen SC from the projector 100C, and then determines the wavelength range in which the spectral imaging section 137 is made to perform imaging based on the color information thus received. When the imaging control section 451 has determined the wavelength range, the imaging control section 451 makes the spectral imaging section 420 perform imaging while changing the spectral wavelength λi at the first wavelength intervals within the wavelength range thus determined.

The estimation value calculation section 453 calculates the estimation values of the spectra at the second wavelength intervals similarly to the estimation value calculation section 175 in the first embodiment, and the generation section 455 generates the correction parameters similarly to the generation section 177 in the first embodiment. The generation section 455 transmits the correction parameters thus generated to the projector 100C with the communication section 410.

The configuration of the projector 100C is substantially the same as that of the projector 100 according to the first embodiment shown in FIG. 1, and therefore, the description of the configuration will be omitted. The projector 100C is not required to be provided with the spectral imaging section 137.

Figure 12:
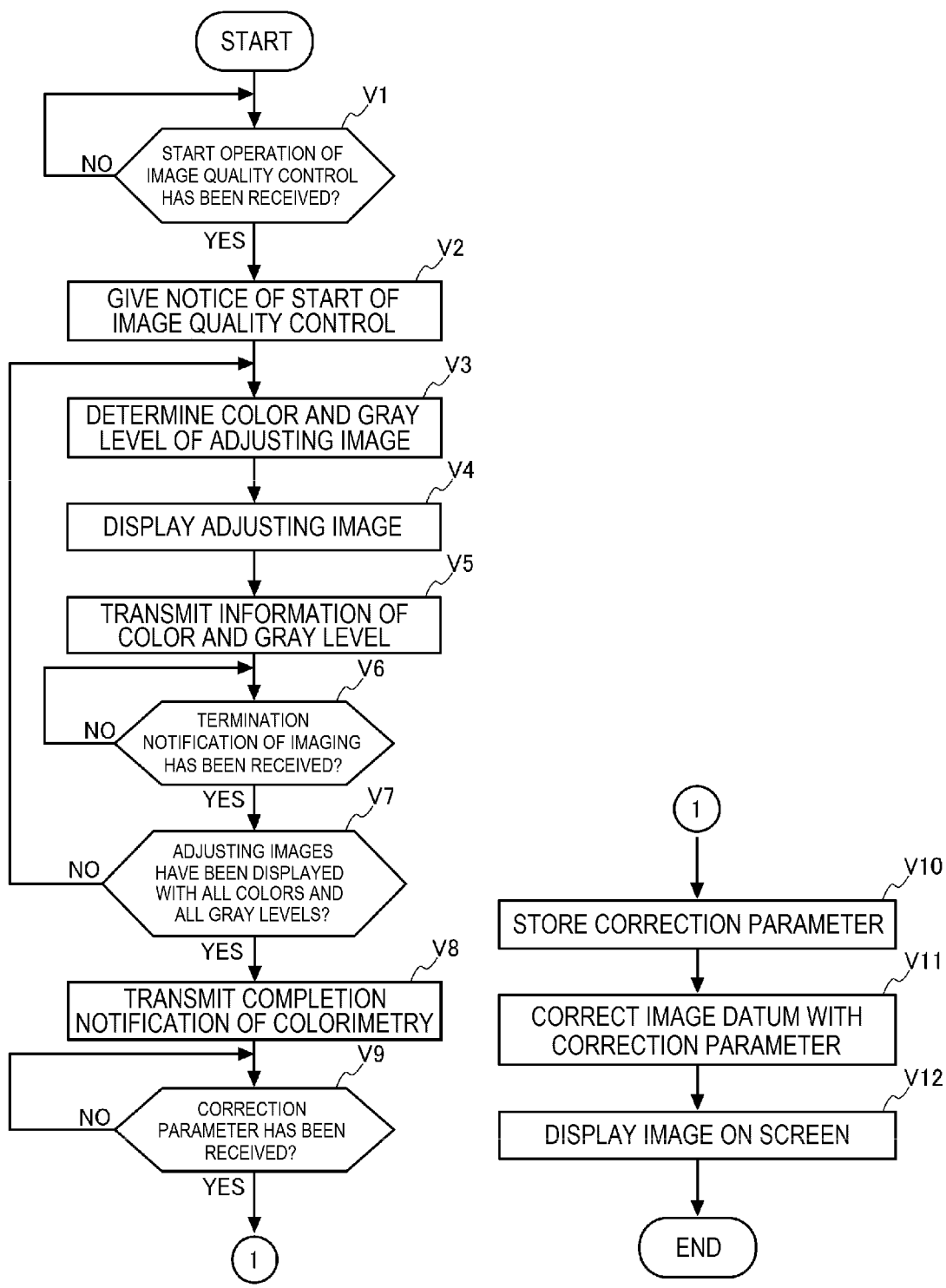
FIG. 12 is a flowchart showing an operation of a projector according to the third embodiment.

FIG. 12 is a flowchart showing an operation of the projector 100C according to the third embodiment.

Firstly, the control section 150 determines (step V1) whether or not the operation of selecting the image quality control has been received. When the control section 150 has received the operation of selecting the image quality control (YES in the step V1), the control section 150 notifies (step V2) the colorimetric device 400 of the start of the image quality control.

In this flowchart, the description of the procedure of calculating the projective transformation matrix 167b described in the flowchart shown in FIG. 3 is omitted. In other words, the description will be presented assuming that the projective transformation matrix 167b has been calculated in advance, and stored in the storage section 440.

Then, the control section 150 determines (step V3) the color and the gray level of the adjusting image to be displayed on the screen SC. When the control section 150 has determined the color and the gray level of the adjusting image, the control section 150 retrieves the adjusting image datum 162 with the color and the gray level thus determined from the storage section 160. The control section 150 makes the image processing section 143 process the adjusting image datum 162 thus retrieved, and controls the drive section 120 and the projection section 110 to display (step V4) the adjusting image corresponding to the adjusting image datum 162 on the screen SC.

Then, the control section 150 transmits (step V5) the information of the color and the gray level of the adjusting image displayed to the colorimetric device 400. When the control section 150 has transmitted the information of the color and the gray level of the adjusting image to the colorimetric device 400, the control section 150 stands still (step V6) until a notification of a completion of imaging is received from the colorimetric device 400. When the control section 150 has received the notification of the completion of imaging from the colorimetric device 400 (YES in the step V6), the control section 150 determines (step V7) whether or not the adjusting images of all of the colors have been displayed at all of the gray levels. When the control section 150 has not displayed the adjusting images of all of the colors at all of the gray levels (NO in the step V7), the control section 150 returns to the step V3 to select (step V3) the color and the gray level of the adjusting image to be displayed on the screen SC.

Further, when the control section 150 has displayed the adjusting images of all of the colors at all of the gray levels (YES in the step V7), the control section 150 transmits (step V8) a completion notification of the colorimetry to the colorimetric device 400. When the completion notification of the colorimetry has been transmitted to the colorimetric device 400, the control section 150 determines (step V9) whether or not the correction parameters have been received from the colorimetric device 400. When the control section 150 has not received the correction parameters (NO in the step V9), the control section 150 waits until the correction parameters are received. Further, when the control section 150 has received the correction parameters (YES in the step V9), the control section 150 stores (step V10) the correction parameters thus received in the storage section 160.

Subsequently, when the supply of the image signal from the image supply device 200 begins, the control section 150 makes the image processing section 143 correct (step V11) the image datum using the correction parameters thus generated, and then makes the projection section 110 project the image light based on the image datum thus corrected on the screen SC. Thus, the image based on the image datum the tint of which has been corrected with the correction parameters is displayed (step V12) on the screen SC.

Figure 13:
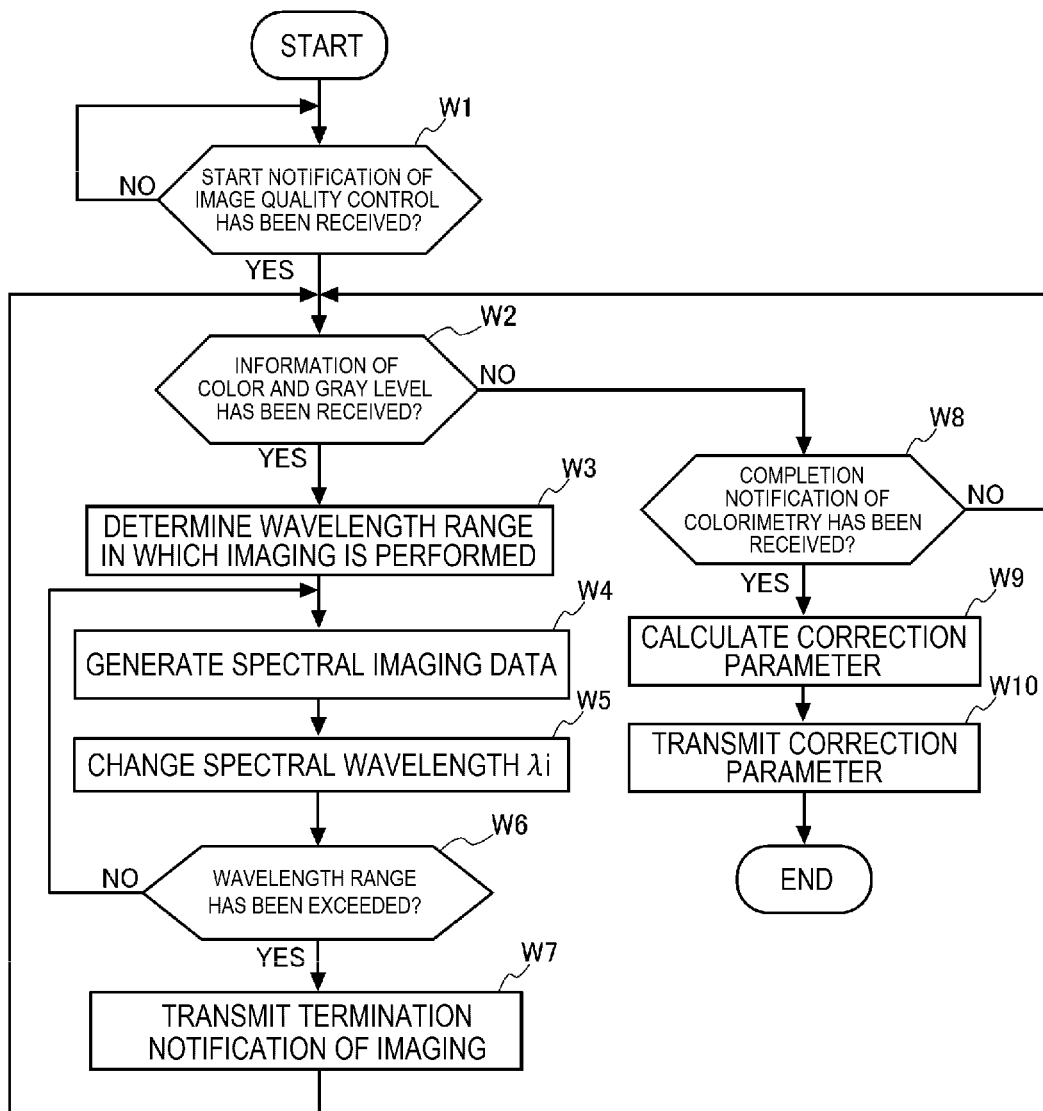
FIG. 13 is a flowchart showing an operation of the colorimetric device.

FIG. 13 is a flowchart showing the operation of the colorimetric device 400.

Firstly, the control section 430 determines (step W1) whether or not a start notification of the image quality control has been received from the projector 100C. When the control section 430 has not received the start notification of the image quality control (NO in the step W1), the control section 430 stands ready to start the process until the start notification is received.

When the control section 430 has received the start notification of the image quality control (YES in the step W1), the control section 430 determines (step W2) whether or not the information of the color and the gray level of the adjusting image display on the screen SC has been received from the projector 100C. When the control section 430 has not received the information of the color and the gray level of the adjusting image from the projector 100C (NO in the step W2), the control section 430 makes the transition to the determination in the step W8.

Further, when the control section 430 has received the information of the color and the gray level of the adjusting image from the projector 100C (YES in the step W2), the control section 430 determines (step W3) the wavelength range in which the spectral imaging section 420 is made to perform imaging based on the information of the color and the gray level of the adjusting image thus received. When the control section 430 has determined the wavelength range, the control section 430 sets the minimum value in the wavelength range as the setting spectral wavelength λi to be set to the spectral element 302, and then makes the spectral imaging section 420 perform imaging to generate (step W4) the spectral imaging datum.

Then, the control section 430 changes (step W5) the value of the setting spectral wavelength λi to be set to the spectral imaging section 420 to a value larger as much as a predetermined value, and then determines (step W6) whether or not the setting spectral wavelength λi has proceeded the wavelength range. When the setting spectral wavelength λi has not proceeded the wavelength range (NO in the step W6), the control section 430 sets the setting spectral wavelength λi to the spectral element 302, and then makes the spectral imaging section 420 perform imaging to generate (step W4) the spectral imaging datum.

Further, when the setting spectral wavelength λi has proceeded the wavelength range (YES in the step W6), the control section 430 transmits (step W7) a termination notification of the imaging to the projector 100C. Subsequently, the control section 430 returns to the determination in the step W2.

Further, when the determination in the step W2 has been a negative determination (NO in the step W2), the control section 430 determines (step W8) whether or not the completion notification of the colorimetry has been received from the projector 100C. When the control section 430 has not received the completion notification of the colorimetry from the projector 100C (NO in the step W8), the control section 430 makes the transition to the determination in the step W2. Further, when the control section 430 has received the completion notification of the colorimetry from the projector 100C (YES in the step W8), the control section 430 calculates (step W9) the correction parameters. The calculation procedure of the correction parameters has already been described with reference to FIG. 4, and therefore, the description thereof will be omitted. When the control section 430 has calculated the correction parameters, the control section 430 transmits (step W10) the correction parameters thus calculated to the projector 100C.

Also in the third embodiment, substantially the same advantages as in the first embodiment can be obtained.

Fourth Embodiment

Figure 14:
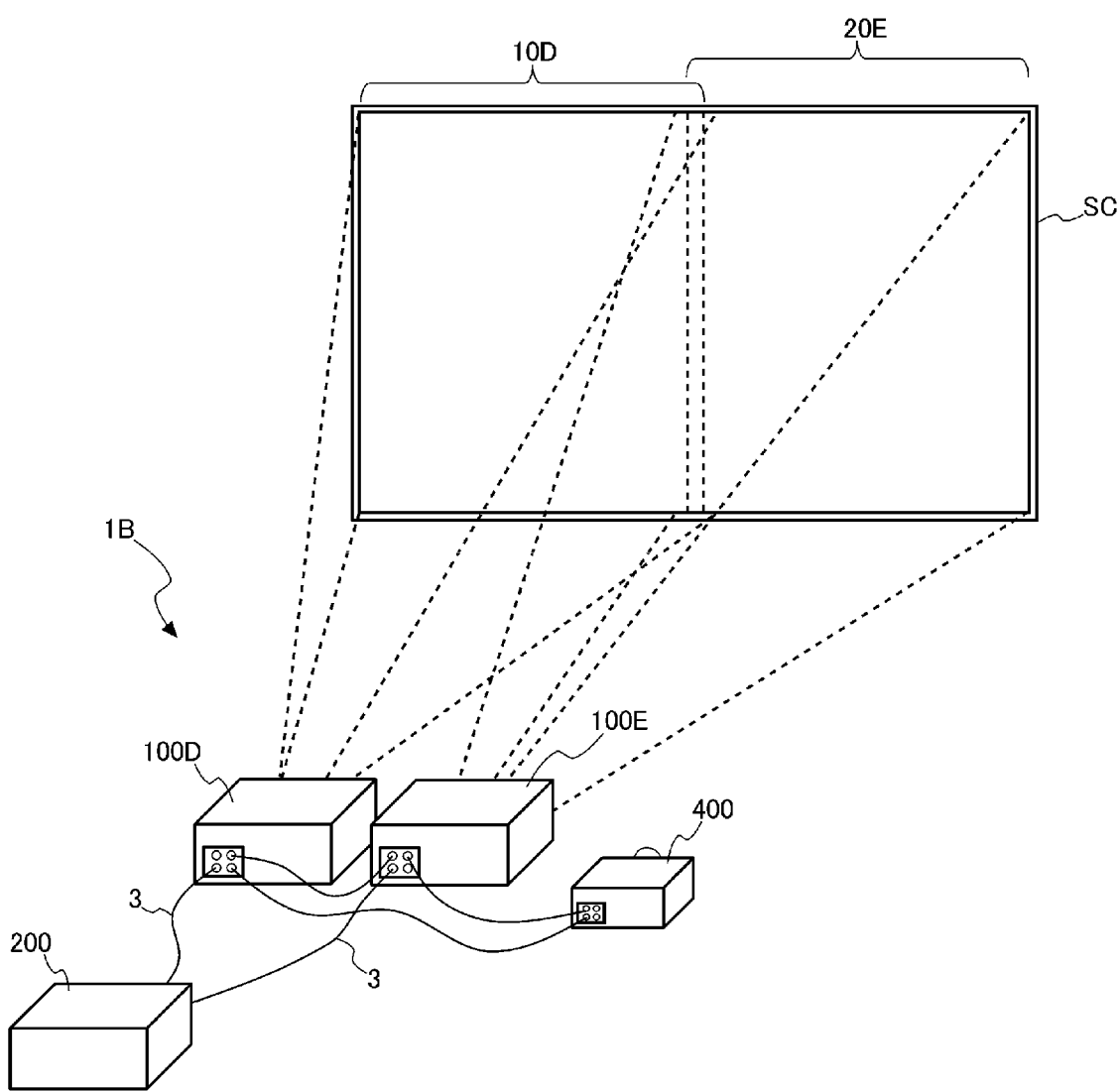
FIG. 14 is a system configuration diagram according to a fourth embodiment.

FIG. 14 is a diagram showing a system configuration in a fourth embodiment.

In the second embodiment described above, there is described the method of correcting the tint of the image using the spectral imaging sections 137A, 137B respectively installed in the projectors 100A, 100B. In the fourth embodiment, there will be described a configuration in which the colorimetric device 400 provided with the spectral imaging section 420 is disposed separately from projectors 100D, 100E. The fourth embodiment is an embodiment of a display system 1B in which the colorimetric device 400, and the projectors 100D, 100E are coupled to each other with cables 3 to perform data communication between the colorimetric device 400 and the projectors 100D, 100E. In the fourth embodiment, the data communication is performed between the plurality of projectors 100 to perform color matching of the images to be displayed by the respective projectors 100. It should be noted that there is described in the fourth embodiment when the colorimetric device 400 and the projectors 100D, 100E are coupled to each other with wire, but the coupling between the colorimetric device 400 and the projectors 100D, 100E can also be achieved wirelessly.

The projector 100D and the projector 100E are each coupled to the image supply device 200 via the cable 3, and each display an image based on the image signal supplied from the image supply device 200 on the screen SC.

The projector 100D operates as a master machine, and the projector 100E operates as a slave machine. In other words, the projector 100E operates in accordance with the control by the projector 100D. The projector 100D as the master machine instructs the projector 100E to calculate the tristimulus values described in the first embodiment, or generates the correction parameter and then transmits the correction parameter to the projector 100E.

An area in which the projector 100D projects the image light is referred to as a projection area 10D, and an area in which the projector 100E projects the image light is referred to as a projection area 20E. The projection area 10D and the projection area 20E partially overlap each other.

The projectors 100D, 100E display the adjusting images on the screen SC, and the colorimetric device 400 takes the adjusting images thus displayed with the spectral imaging section 420 to generate the spectral imaging data. Generation of the correction parameters can be performed by the projectors 100D, 100E, or can also be performed by the colorimetric device 400. It is possible for the colorimetric device 400 to transmit the spectral imaging data thus generated to the projectors 100D, 100E or to generate the correction parameters based on the spectral imaging data and then transmit the correction parameters thus generated to the projectors 100D, 100E.

The colorimetric device 400 is installed at a position where an image of a range including the screen SC can be taken. The colorimetric device 400 takes an image of the projection area 10D when the projector 100D projects the adjusting image, and takes an image of the projection area 20E when the projector 100E projects the adjusting image.

The embodiments described above are each a preferred embodiment of the present disclosure. It should be noted that the present disclosure is not limited to the embodiments, but can be implemented with a variety of modifications within the scope or the spirit of the present disclosure.

For example, in the embodiments described above, the description is presented citing when displaying the monochromatic images of each of the colors of R, G, and B as the adjusting images as an example, but it is also possible to adopt a configuration of including an R area, a G area, and a B area in one adjusting image.

Further, although in the above description of the embodiments, the explanation is presented citing the configuration in which the three transmissive liquid crystal panels corresponding respectively to the colors of R, G, and B are used as the light modulation device 113 for modulating the light emitted by the light source as an example, the present disclosure is not limited to this example. For example, it is also possible to adopt a configuration of using three reflective liquid crystal panels, or to use a system having a liquid crystal panel and a color wheel combined with each other. Alternatively, the present disclosure can be constituted by a system using three digital mirror devices (DMD), a DMD system having a single digital mirror device and a color wheel combined with each other, or the like. When using just one liquid crystal panel or DMD as the light modulation device, the member corresponding to the combining optical system such as the cross dichroic prism is unnecessary. Further, besides the liquid crystal panel or the DMD, any light modulation device capable of modulating the light emitted by the light source can be adopted without problems.

Further, the processing units of the flowchart shown in each of FIG. 4, FIG. 8, FIG. 9, FIG. 12, and FIG. 13 are obtained by dividing the process in accordance with major processing contents in order to make the process easy to understand, and the present disclosure is not at all limited by the way of dividing the process into the processing units or the names of the processing units. The process can be divided into a larger number of processing units, or can also be divided so that one processing unit includes a larger amount of process in accordance with the processing contents. Further, the order of the processes can also be arbitrarily exchanged within a range in which no problem is posed in the scope or the spirit of the present disclosure.

Further, each of the functional sections shown in FIG. 1 and FIG. 11 is for representing the functional configuration, and the specific implementation configuration is not particularly limited. In other words, it is not necessarily required to install the hardware corresponding individually to each of the functional sections, but it is obviously possible to adopt a configuration of realizing the functions of the plurality of functional sections by a single processor executing a program. Further, a part of the function realized by software in the embodiments described above can also be realized by hardware, or a part of the function realized by hardware can also be realized by software. Further, the specific detailed configuration of each of other sections of the projector 100 can arbitrarily be modified within the scope or the spirit of the present disclosure.

Further, when realizing the method of controlling the projector, the colorimetric method, and the image correction method according to the present disclosure using a computer, it is also possible to configure the program to be executed by the computer as an aspect to a recording medium, or an aspect of a transmission medium for transmitting the program. As the recording medium, there can be used a magnetic or optical recording medium, or a semiconductor memory device. Specifically, as the recording medium, there can be cited a flexible disk, an HDD (Hard Disk Drive), a CD-ROM (Compact Disc Read Only Memory), a DVD (Digital Versatile Disk), a Blu-ray (registered trademark) disc, and a magnetooptic disc. Further, as the recording medium, it is also possible to cite a portable or a rigid recording medium such as a flash memory or a card-type recording medium. Further, the recording medium described above can also be a RAM (Random Access Memory), or a nonvolatile storage device such as a ROM (Read Only Memory) or the HDD as an internal storage device provided to the display device.

What is claimed is:

1. A projector comprising:
a projection section;
a spectral imaging section including an imaging element and a spectral element; and
a control section configured to control the projection section and the spectral imaging section, wherein
the control section
sets a first color and a first gray level as a color and a gray level of an image to be projected by the projection section, then makes the projection section project a first image corresponding to the first color and the first gray level set,
sets a first measurement condition corresponding to the first color to the spectral imaging section, then makes the spectral imaging section take the first image projected by the projection section to obtain first taken image information,
sets the first color and a second gray level as the color and the gray level of the image to be projected by the projection section, then makes the projection section project a second image corresponding to the first color and the second gray level set,
sets the first measurement condition corresponding to the first color to the spectral imaging section, then makes the spectral imaging section take the second image projected by the projection section to obtain second taken image information,
sets a second color and a third gray level as the color and the gray level of the image to be projected by the projection section, then makes the projection section project a third image corresponding to the second color and the third gray level set,
sets a second measurement condition corresponding to the second color to the spectral imaging section, then makes the spectral imaging section take the third image projected by the projection section to obtain third taken image information,
sets the second color and a fourth gray level as the color and the gray level of the image to be projected by the projection section, then makes the projection section project a fourth image corresponding to the second color and the fourth gray level set, and
sets the second measurement condition corresponding to the second color to the spectral imaging section, then makes the spectral imaging section take the fourth image projected by the projection section to obtain fourth taken image information.

2. The projector according to claim 1, wherein
the control section generates a correction parameter used to correct an image datum which an image to be projected by the projection section derives from based on the first taken image information, the second taken image information, the third taken image information, and the fourth taken image information obtained.

3. The projector according to claim 1, wherein
the control section
sets a wavelength range corresponding to the first color as an imaging range as the first measurement condition, then makes the spectral imaging section perform imaging while changing a spectral wavelength of the spectral element at first wavelength intervals to obtain an intensity of light corresponding to the spectral wavelength as the first taken image information and the second taken image information, and
sets a wavelength range corresponding to the second color as the imaging range as the second measurement condition, then makes the spectral imaging section perform imaging while changing the spectral wavelength of the spectral element at the first wavelength intervals to obtain an intensity of light corresponding to the spectral wavelength as the third taken image information and the fourth taken image information.

4. The projector according to claim 3, wherein
the control section calculates estimation values of spectra at second wavelength intervals shorter than the first wavelength interval based on the intensity of the light at the first wavelength intervals obtained as the first taken image information, the second taken image information, the third taken image information, and the fourth taken image information, and an estimation matrix used for estimation of the spectra.

5. The projector according to claim 4, wherein
the estimation matrix is calculated based on the first taken image information, the second taken image information, the third taken image information, and the fourth taken image information output by the spectral imaging section.

6. The projector according to claim 5, wherein
the estimation matrix has a determinant minimizing a square error between a measurement datum obtained by measuring the first image, the second image, the third image, and the fourth image using a dedicated measurement device at the second wavelength intervals and the estimation values.

7. The projector according to claim 3, wherein
the spectral element includes
a pair of reflecting films opposed to each other, and
a gap changing section configured to change a distance between the pair of reflecting films, and
the control section makes the gap changing section change the distance between the pair of reflecting films to change the spectral wavelength of the spectral element.

8. The projector according to claim 1, wherein
the control section
sets a third color and a fifth gray level as the color and the gray level of the image to be projected by the projection section, then makes the projection section project a fifth image corresponding to the third color and the fifth gray level set,
sets a third measurement condition corresponding to the third color to the spectral imaging section, then makes the spectral imaging section take the fifth image projected by the projection section to obtain fifth taken image information,
sets the third color and a sixth gray level as the color and the gray level of the image to be projected by the projection section, then makes the projection section project a sixth image corresponding to the third color and the sixth gray level set, and
sets the third measurement condition corresponding to the third color to the spectral imaging section, then makes the spectral imaging section take the sixth image projected by the projection section to obtain sixth taken image information.

9. The projector according to claim 8, wherein
the first color is red, the first gray level is lower than the second gray level,
the second color is green, the third gray level is lower than the fourth gray level,
the third color is blue, the fifth gray level is lower than the sixth gray level,
a wavelength range corresponding to red is set as the first measurement condition,
a wavelength range corresponding to green is set as the second measurement condition, and
a wavelength range corresponding to blue is set as the third measurement condition.

10. The projector according to claim 8, wherein
the first gray level, the third gray level, and the fifth gray level are equal to each other, and
the second gray level, the fourth gray level, and the sixth gray level are equal to each other.

11. The projector according to claim 8, wherein
the control section
sets the first color and a seventh gray level as the color and the gray level of the image to be projected by the projection section, then makes the projection section project a seventh image corresponding to the first color and the seventh gray level set,
sets the first measurement condition corresponding to the first color to the spectral imaging section, then makes the spectral imaging section take the seventh image projected by the projection section to obtain seventh taken image information,
sets the second color and an eighth gray level as the color and the gray level of the image to be projected by the projection section, then makes the projection section project an eighth image corresponding to the second color and the eighth gray level set,
sets the second measurement condition corresponding to the second color to the spectral imaging section, then makes the spectral imaging section take the eighth image projected by the projection section to obtain eighth taken image information,
sets the third color and a ninth gray level as the color and the gray level of the image to be projected by the projection section, then makes the projection section project a ninth image corresponding to the third color and the ninth gray level set, and
sets the third measurement condition corresponding to the third color to the spectral imaging section, then makes the spectral imaging section take the ninth image projected by the projection section to obtain ninth taken image information,
the seventh gray level is a gray level between the first gray level and the second gray level,
the eighth gray level is a gray level between the third gray level and the fourth gray level, and
the ninth gray level is a gray level between the fifth gray level and the sixth gray level.

* * * * *